(12) United States Patent
Dally et al.

(10) Patent No.: US 6,891,834 B1
(45) Date of Patent: May 10, 2005

(54) APPARATUS AND METHOD FOR PACKET SCHEDULING

(75) Inventors: William J. Dally, Stanford, CA (US);
Philip P. Carvey, Bedford, MA (US);
Paul A. Beliveau, Essex Jct., VT (US);
William F. Mann, Sudbury, MA (US);
Larry R. Dennison, Norwood, MA (US)

(73) Assignee: Avici Systems, North Billerica, MA (US)

( * ) Notice: Subject to any disclaimer, the term of this patent is extended or adjusted under 35 U.S.C. 154(b) by 660 days.

(21) Appl. No.: 09/588,619

(22) Filed: Jun. 6, 2000

Related U.S. Application Data

(60) Provisional application No. 60/153,148, filed on Sep. 9, 1999.

(51) Int. Cl.$^7$ .............................................. H04L 12/56
(52) U.S. Cl. ..................... 370/395.4; 370/412; 370/428
(58) Field of Search ......................... 370/395.21, 395.4, 370/395.41, 395.42, 395.43, 412, 428

(56) References Cited

U.S. PATENT DOCUMENTS

| | | | | |
|---|---|---|---|---|
| 5,455,825 | A | | 10/1995 | Lauer et al. .................. 370/60 |
| 5,832,304 | A | * | 11/1998 | Bauman et al. ............... 710/40 |
| 5,850,399 | A | * | 12/1998 | Ganmukhi et al. ......... 370/412 |
| 6,438,134 | B1 | * | 8/2002 | Chow et al. ................. 370/412 |
| 6,469,982 | B1 | * | 10/2002 | Henrion et al. ............. 370/230 |

FOREIGN PATENT DOCUMENTS

EP 0859492 A2 8/1998
WO WO 99/00949 1/1999

OTHER PUBLICATIONS

Zhang, Hui, "Service Disciplines for Guaranteed Performance Service in Packet–Switching Networks," Proceedings of the IEEE, vol. 83, No. 10, Oct. 1995, pp. 1374–1396.
Ferguson and Huston, *Quality of Service*, Wiley, 1998, pp. 61 and 65.
Cormen, Leiserson & Rivest, "Introduction to Algorithms," MIT Press, 1990, Chapter 28.
Zhang, "Service Disciplines for Guaranteed Performance Service In Packet–Switching Networks," Proceedings of the IEEE, 83 (10), Oct. 1995.
Knuth, "The Art of Computer Programming," vol. 3, "Sorting and Searching," Addison–Wesley, 1973, pp. 142–145 and 209–212.

* cited by examiner

*Primary Examiner*—Man U. Phan
*Assistant Examiner*—Toan Nguyen
(74) *Attorney, Agent, or Firm*—Hamilton, Brook, Smith & Reynolds, P.C.

(57) ABSTRACT

In a network router, a tree structure or a sorting network is used to compare scheduling values and select a packet to be forwarded from an appropriate queue. In the tree structure, each leaf represents the scheduling value of a queue and internal nodes of the structure represent winners in comparisons of scheduling values of sibling nodes of the tree structure. CBR scheduling values may first be compared to select a queue and, if transmission from a CBR queue is not timely, a packet may be selected using WFQ scheduling values. The scheduling values are updated to reflect variable packet lengths and byte stuffing in the prior packet. Scheduling may be performed in multiple stages.

56 Claims, 22 Drawing Sheets

| Register | Cycle | | | | |
|---|---|---|---|---|---|
| | 1 | 2 | 3 | 4 | 5 |
| Addr 1 | 5 | 7 | 2 | | |
| Comp 1 | 5.9 | 7.d | 2.15 | | |
| Sib 1 | 4.10 | 6.11 | 3.7 | | |
| Addr 2 | | 10 | 11 | 9 | |
| Comp 2 | | 5.9 | 6.11 | 3.7 | |
| Sib 2 | | 7.6 | 5.9 | 0.8 | |
| Addr 3 | | | 13 | 13 | 12 |
| Comp 3 | | | 7.6 | 5.9 | 3.7 |
| Sib 3 | | | 2.5 | 2.5 | 5.9 |
| Result | | | 2.5 | 2.5 | 3.7 |

FIG. 9

Stuffed Bytes

Overhead

Packet Length

\Sum/

WFQ Weight

\Mult/

\Sum/

TTT

FIG. 13

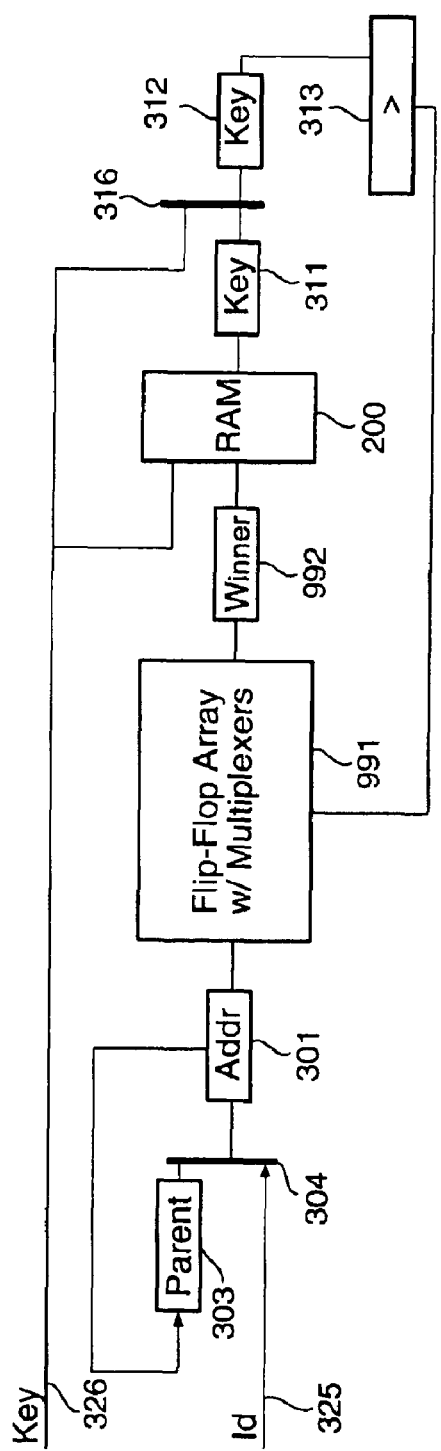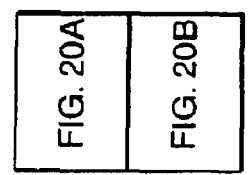
FIG. 19
FIG. 20

APPARATUS AND METHOD FOR PACKET SCHEDULING

RELATED APPLICATION(S)

This application claims the benefit of U.S. Provisional Application No. 60/153,148 filed Sep. 9, 1999, the entire teachings of which are incorporated herein by reference.

BACKGROUND OF THE INVENTION

The quality of service (QoS) experienced by packets on a network is characterized by delay, jitter, and loss. Many network applications are sensitive to one or more of these parameters. An interactive application, for example, becomes unusable if the total delay of the network exceeds a threshold. Streaming applications, such as video, can tolerate a large fixed delay but require excessive buffer space if the jitter or variation in delay experienced by different packets exceeds a threshold. Other applications cannot tolerate packet loss, for example packets being dropped due to excessive congestion.

Most Internet traffic today is handled as a single class of traffic that is delivered on a best-effort basis. That is, the network makes an effort to deliver all packets in a reasonable amount of time but makes no guarantees about delay or loss. Due to the bursty nature of network traffic, some packets may be delayed or dropped due to congestion, and the delay experienced by packets may vary considerably from packet to packet. While best efforts delivery is adequate for many types of traffic, such as file-transfers and web page access, it is not suitable for other types of traffic, such as real-time audio and video streams.

To support traffic with real-time constraints as well as to provide a premium class of service to certain customers, some networks separate traffic into classes and provide service guarantees for each class of traffic. For example, traffic may be divided into one class that is guaranteed a constant bit rate and a constant delay, a second class that is guaranteed a minimum bit-rate, and one or more classes of best efforts traffic that are allocated different fractions of the total network bandwidth.

The class of service that a unit of transport (packet, cell, or frame) in a network receives may be encoded in the unit in a number of different ways. In an Internet packet, for example, the service class may be determined using the 8-bit type-of-service (ToS) field in the packet header. Alternately, the service class may be derived from the flow to which the packet belongs. In an ATM network, the service class is associated with the virtual circuit over which a cell is traveling.

Service guarantees are implemented through a combination of input policing and output scheduling. Input policing ensures that all traffic arriving at a router is in compliance with the appropriate service contract. When a packet arrives at a router, it is checked to determine if its arrival time is in compliance with its service contract. If the packet is compliant, it is processed normally. If a packet is out of compliance, for example if a flow that is guaranteed 10 Mbits/s of bandwidth is consuming 15 Mbits/s, it is marked. The packet may then be processed normally, have its service degraded, or be dropped, depending on network policy.

Output scheduling determines the order in which packets leave the router over a particular output channel. Scheduling is a key factor in guaranteeing a particular quality of service. For example, to guarantee a constant bit rate to a particular flow, the packets of this flow must be scheduled ahead of the packets from a bursty best-efforts flow that may itself exceed the available capacity. To ensure low jitter on a streaming flow, each packet must be scheduled to depart the router in a narrow window of time.

Output scheduling for guaranteed bit rate (GBR) traffic is often performed using a multiple queue structure as illustrated in FIG. 6. A separate output queue 501–503 is provided for each class of traffic (class-based queuing (CBQ)) or for each network flow (per-flow queuing). Three queues are shown in the figure, but other numbers are possible. Each queue contains some number of packets (e.g., packet 521) awaiting transmission over the output line 531. Associated with each queue is a counter 511–513 that indicates when the next packet should depart the queue. For queues associated with constant bit-rate traffic, for example, the counter indicates the time at which the next packet may depart the queue. After a packet departs the queue, the counter is updated with the present time, plus an increment that reflects the length of the packet divided by the bandwidth allocation. This method of update corresponds to the ATM 'leaky-bucket' algorithm for constant-bit-rate QoS.

Output scheduling for best-efforts traffic is often performed using weighted-fair queuing (WFQ). Such traffic is also scheduled using the apparatus illustrated in FIG. 6, with a separate queue for each class of traffic or for each flow. For best efforts traffic, however, the packets in the queues have not been allocated a guaranteed bit rate on the output port. Rather, each queue has been allocated a fraction of available bandwidth and packets are scheduled on a best efforts basis according to the available bandwidth. For queues associated with this best-efforts traffic the counters 511–513 associated with each queue are incremented according to a weighted-fair queuing algorithm and, when output bandwidth is available, the queue associated with the smallest count is selected to transmit and its counter incremented by the reciprocal of its bandwidth 'share'.

In prior-art routers, this task of searching for the lowest counter, selecting the appropriate queue, and updating the counter associated with this queue is typically performed in software running on a microprocessor. Because of the processing overhead required for transmitting each packet with class-based queuing or per-flow queuing, these mechanisms are usually restricted to use on low-speed links and with a moderate number of queues (10s not 100s). (c.f., Ferguson and Huston, *Quality of Service,* Wiley, 1998, p. 61).

SUMMARY OF THE INVENTION

In accordance with one aspect of the invention, a network router comprises queues which store data packets to be forwarded. A scheduler which selects a queue from which a packet is forwarded holds scheduling values, such as CBR and WFQ counter values, associated with the queues. Scheduling values are compared in a selection network to select the packets to be forwarded.

The selection network may be a tree structure where each leaf of the tree structure represents a scheduling value of a queue. Internal nodes of the tree structure represent winners in comparisons of scheduling values of sibling nodes of the tree structure. Alternatively, the selection network may be a sorting network by which the scheduling values are compared to order the queues by scheduling priority.

In the tree structure, the scheduler may limit comparisons of scheduling values to a path through the tree structure from a leaf node which represents a changed scheduling value to a root of the tree structure.

The internal nodes of the tree structure may store scheduling values from winning sibling nodes. The internal nodes may also store identities of leaf nodes corresponding to the stored scheduling values.

In an alternative tree structure, each node identifies a path to a winning leaf node. A random access memory may store only the leaf nodes while a flip-flop array identifies the winner at each internal node. A comparator compares scheduling values of the leaf nodes in the RAM indicated by the flip-flop array.

In accordance with another aspect of the invention, an additional indicator may be associated with each leaf node to disable the queue of that node from scheduling.

The scheduler may comprise a random access memory for storing the tree structure. An address register stores an address to access from the RAM a scheduling value to be compared. A compare register stores a scheduling value to be compared to the scheduling value from the RAM, and a comparator compares the scheduling values. The scheduler may further include hardware which receives the address in the address register and determines a sibling node where a scheduling value to be compared is stored. The hardware also determines a parent node address at which a winning compared scheduling value is stored.

The scheduler may comprise pipeline stages, each of which compares scheduling values indicated by separate portions of the tree structure. A random access memory is partitioned across the pipeline stages, each partition storing at least one level of the tree structure. Each pipeline stage includes an address register, a compare register, and a comparator.

The scheduler may include scheduling values corresponding to a first scheduling method associated with a first subset of queues and scheduling values corresponding to a second scheduling method associated with a second subset of queues, at least one queue being a member of each of the first subset and second subset of queues.

The scheduling values may include scheduled transmission times according to a constant bit rate (CBR) service guarantee. Scheduling values may additionally represent theoretical transmission times using a weighted-fair-queuing (WFQ) scheduling policy. The earliest scheduled CBR queue is first identified. If the scheduling value of the identified CBR queue is less than or equal to a current time, a corresponding packet is transmitted from that CBR queue and the CBR scheduling value associated with the queue is updated. Otherwise, a packet is transmitted from a WFQ queue having an earliest scheduling value and that scheduling value is updated.

In accordance with another aspect of the invention, the scheduling values are updated to reflect variable packet lengths and to reflect byte stuffing applied to a prior packet.

In accordance with another aspect of the invention, scheduling is performed in multiple stages. Data packets are stored in first and second sets of queues. A first scheduler selects queues of the first set of queues from which packets are forwarded to a first intermediate queue, and a second scheduler selects queues of the second set of queues from which packets are forwarded to a second intermediate queue. A further scheduler selects intermediate queues from which the packets are forwarded. The multistage scheduling may include two or more scheduling stages and each set of queues may be scheduled on the basis of one or more scheduling methods.

More specifically, the present invention enables an apparatus for performing class-based queuing and per-flow queuing at very high line rates (OC48 2.5 Gb/s) with very large numbers of queues (4096 in the preferred embodiment) even when packet sizes are short (as small as 40 Bytes). A single-elimination tournament is conducted among the constant bit rate queues. Each match in the tournament is won by the queue with the lowest counter. If the counter of the queue that wins the tournament is lower than the current time, the head packet in that queue is transmitted and the counter is updated. Otherwise a separate tournament is run for the best-efforts queues.

To allow scheduling of packets at high line rates, the tournaments may be performed using a dedicated hardware structure comprising a RAM to hold a tree of (key, id) pairs representing the tournament, two registers to hold the competitors in the current match, and a comparator. To further speed processing, the tournament is performed incrementally. Each time a counter is changed, only those matches in the tournament on a path from the changed counter to the winner of the tournament are re-run. The remainder of the tournament remains unchanged. With this approach, the tournament can be completed in 1 g(N) cycles, where N is the number of queues competing.

Pipelining the tournament provides even faster scheduling. The tournament can be divided into two or more pipeline stages. Each level of the tree resides completely within one pipeline stage. When a match in the last level of stage i is completed, its result is passed to stage i+1, and stage i is free to start on the next tournament. In the extreme case, each level of the tree may be placed in a separate pipeline stage and the scheduler can complete a tournament, and hence schedule a packet, every clock cycle.

In one embodiment, each queue is associated with two counters, one for constant-bit-rate (CBR) scheduling and one for weighted-fair-queuing (WFQ) scheduling. The packet scheduling engine first allocates bandwidth to CBR queues using a CBR algorithm to update the CBR counters. Then, any remaining bandwidth is allocated to the WFQ queues using a WFQ algorithm to update the WFQ counters. By setting the weights associated with these counters, a given queue may be allocated CBR bandwidth or WFQ bandwidth, or it can first be allocated its allotment of CBR bandwidth and then share in the WFQ bandwidth after all CBR allotments have been satisfied.

To allow scheduling of variable length packets and to permit use of the packet scheduler with physical layers that perform byte stuffing, the usual CBR and WFQ scheduling algorithms have been augmented to operate with variable packet size and to use a running count of byte stuffing overhead.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 9 presents example data in registers of the pipeline of FIG. 9 in successive cycles.

FIG. 13 illustrates a circuit for updating a WFQ counter.

FIG. 19 presents a hardware implementation of the tree structure of FIG. 15.

DETAILED DESCRIPTION OF THE INVENTION

A description of preferred embodiments of the invention follows.

Packet Scheduling Using Tournament Sort

Figure 1:
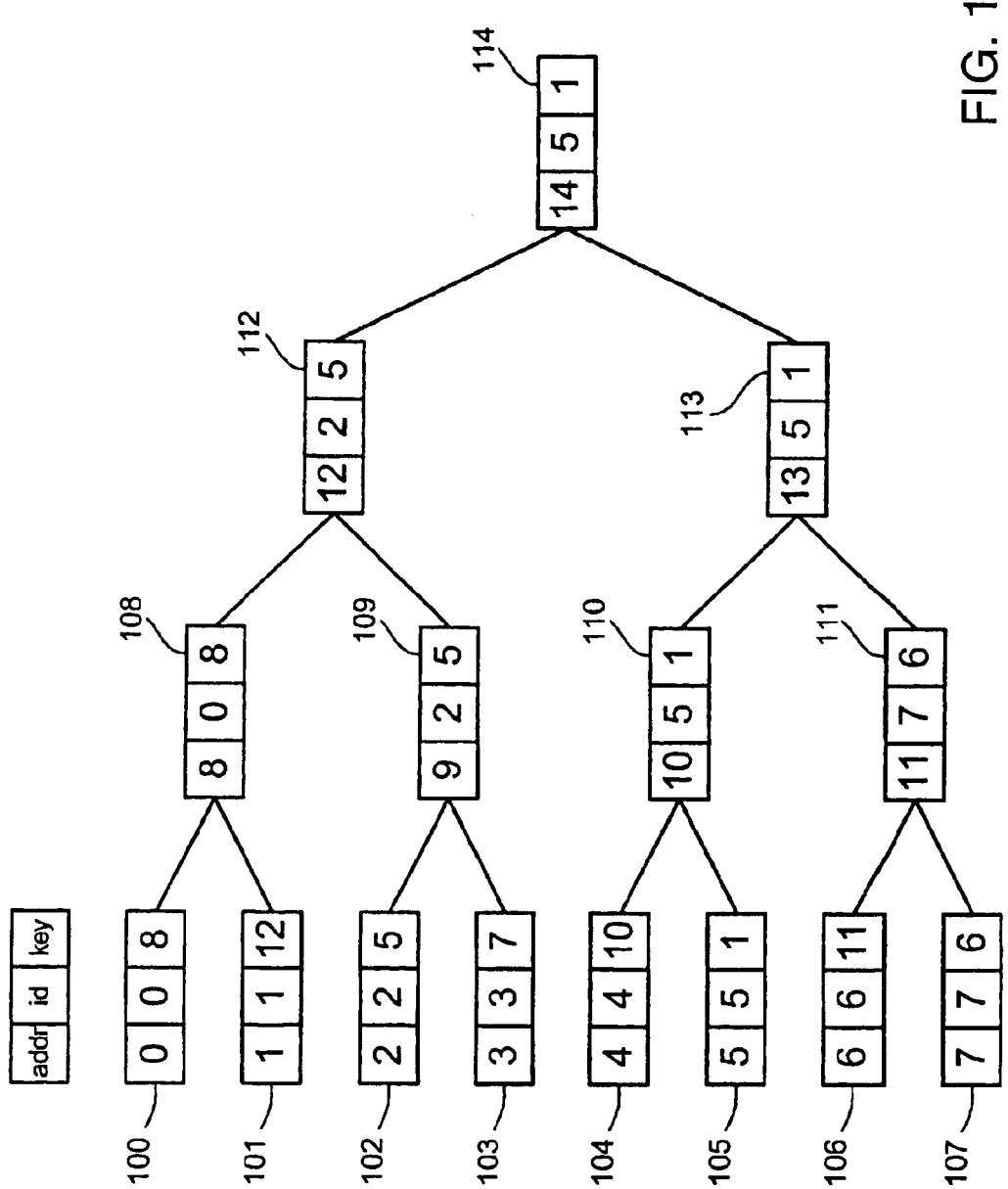
FIG. 1 illustrates a packet scheduling tree structure embodying the invention.

The data structure used to select the queue with the lowest counter is illustrated in FIG. 1. The figure shows a tree of triples. Each triple contains an address, a queue ID, and the associated counter value or key. The leaves of the tree 100–107 represent the counters associated with each queue. For each of these leaves, the address and queue ID are identical and the key holds the value of the counter associated with the identified queue. For clarity the figure shows only eight queues; however, in the preferred embodiment, there are 4,096 queues.

Each internal node of the tree 108–114 of FIG. 1 represents the results of a match in the tournament among the leaf nodes. For example, node 109 represents the result of a match between leaf nodes 102 and 103. Because node 102 has a lower key, it wins this match, and node 109 records this win by copying both the queue ID and key from node 102.

Figure 18:
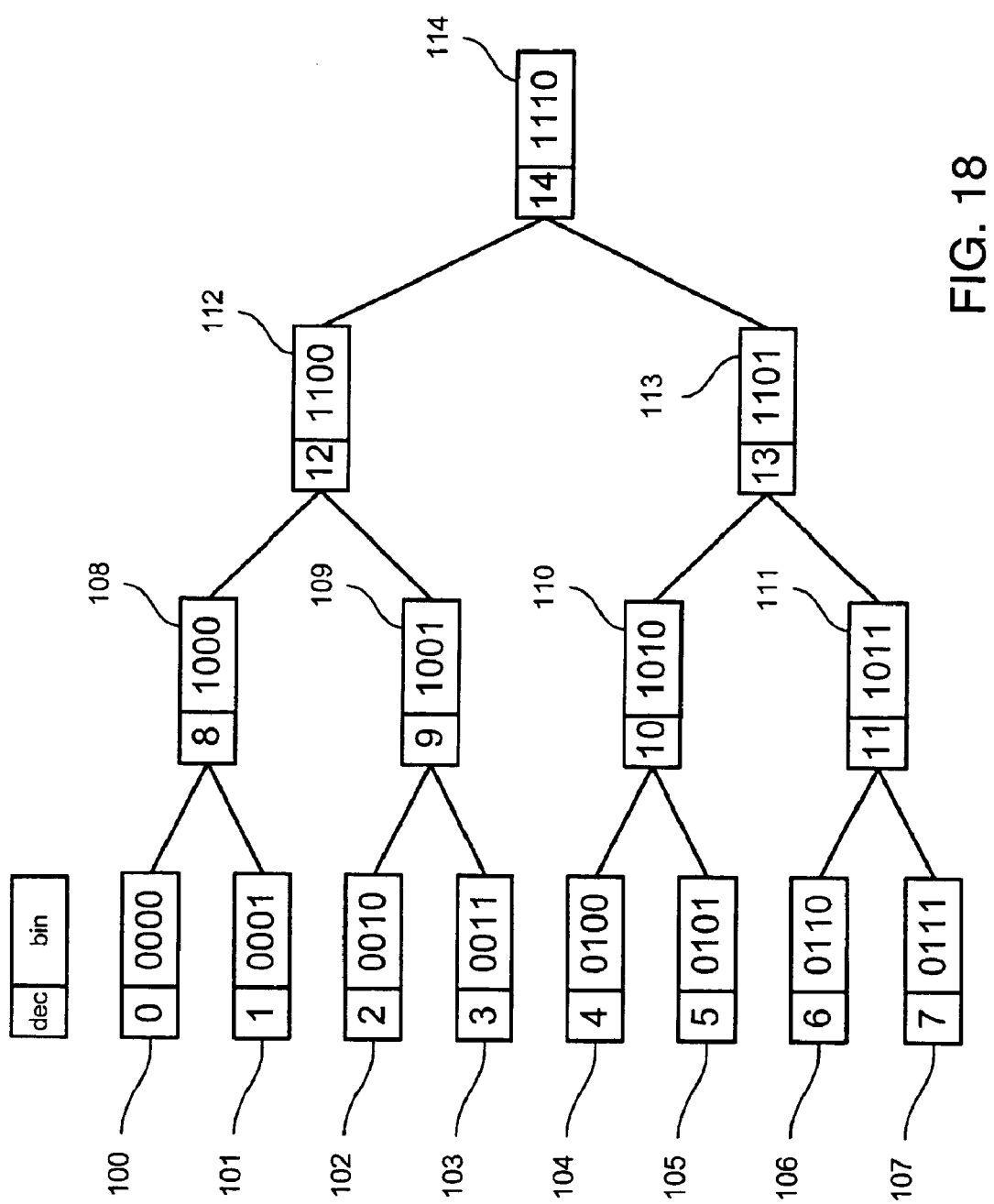
FIG. 18 associates the binary representations of the node addresses with the decimal notations presented in the tree structure of FIG. 1.

The address of node 109, 9, represents its position in the tree. As illustrated in FIG. 18 addresses are b-bit numbers where b=1 g(N)+1. In the example tree of FIGS. 1 and 18, N=8 and b=4. In the preferred embodiment, N=4096 and b=13. Leaf nodes have addresses with the most significant bit cleared while internal nodes have addresses with the most significant bit set. Addresses are assigned to facilitate computation of the addresses of parents, offspring, and sibling nodes. The parent of a node with address a is calculated by shifting a right one bit and then setting the most significant bit. Similarly, the address of the upper child of an internal node b is calculated by shifting b one bit left, and the lower child has an address equal to that of the upper child, but with the least significant bit set. Finally, the address of a node's sibling is given by complementing the least significant bit of the node's address. These calculations are most conveniently expressed in the "C" programming language as:

parent(a)=8|(a>>1);
upperChild(b)=b<<1;
lowerChild(b)=(b<<1)|1;
sibling(c)=c^ 1;

These calculations are particularly efficient in hardware as they involve only shifts, which require only wiring, and single-bit OR or XOR operations.

Given a set of N queues, and hence a tree with N leaf nodes, N−1 matches must be performed in the tournament to select a winner (the queue with the smallest counter). However, we can reduce the number of matches needed per tournament to at most 1 g(N) by observing that for QoS output scheduling, only one counter, that of the last selected queue, changes at a time. Thus, only those matches involving this queue need be replayed. These are the matches on the path from the changed leaf node to the root of the tree. The outcomes of the other matches, those not on this path, remain constant.

Figure 3:
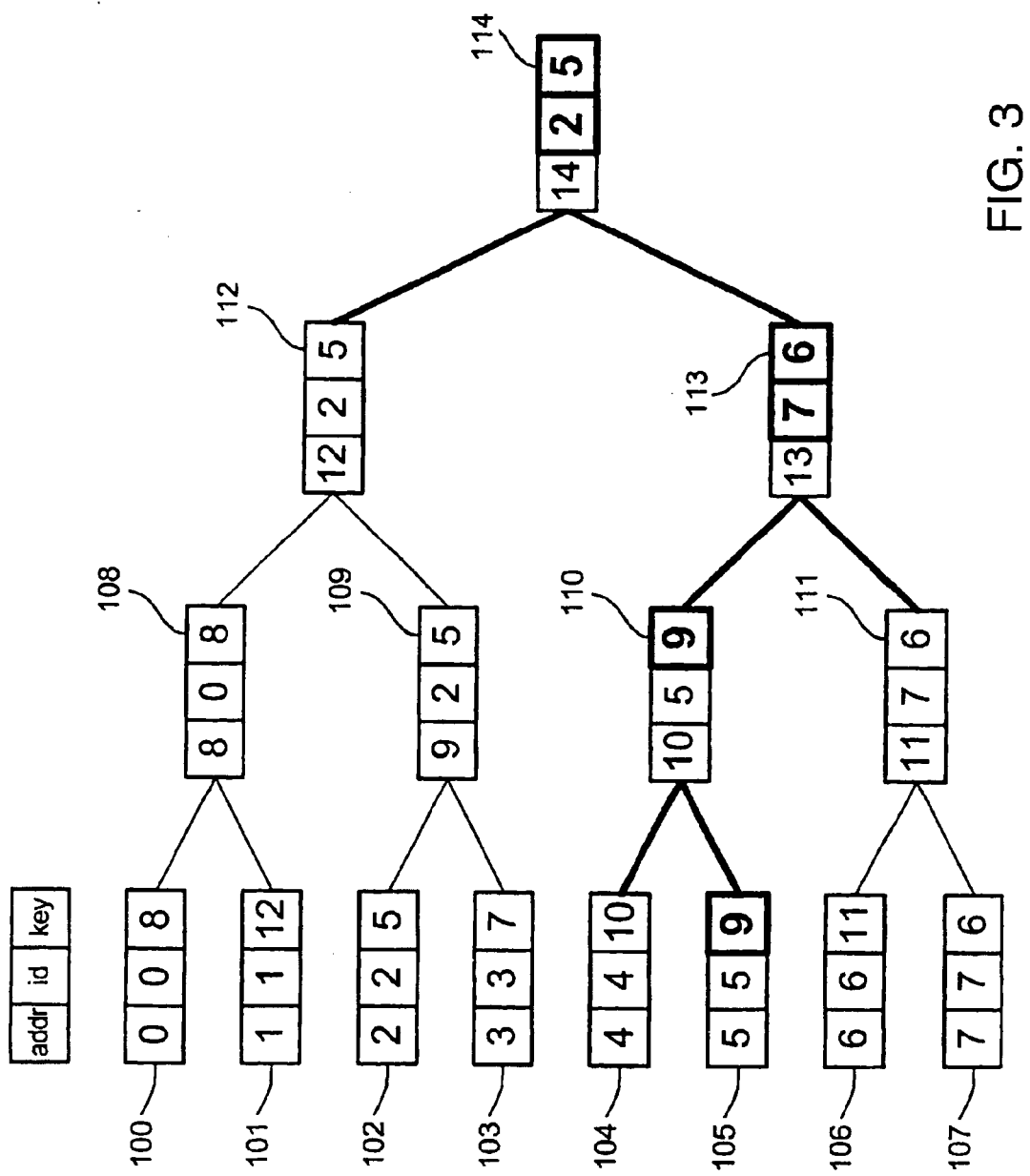
FIG. 3 illustrates the tree structure of FIG. 1 with a change in counter value in node 105 and the resultant change in the internal nodes.

This incremental method of computing the result of a tournament is illustrated in FIG. 3. This figure shows the state of the tree after queue 5, which was selected by the tournament of FIG. 1 has its counter (and hence key) incremented from 1 to 9. The values that have changed in the tree are shown in boldface and the matches that are replayed are shown with bold lines. Because the key of node 105 has changed, the match between nodes 104 and 105 is replayed. This changes the key of node 110, causing the match between 110 and 111 to be replayed. This time queue 5 loses this match, causing both the ID and key of node 113 to change. Finally, the match between nodes 112 and 113 is replayed with node 2 winning the match and hence the tournament.

Thus, as the figure illustrates, after a single counter is updated, the tournament can be recomputed by replaying only 1 g(N) matches, rather than the full N−1. For the example of FIG. 3, this reduces the number of matches from 7 to 3. For the preferred embodiment, it reduces the number of matches to be run from 4,095 to 12.

A Hardware Packet Scheduling Engine

Figure 2:
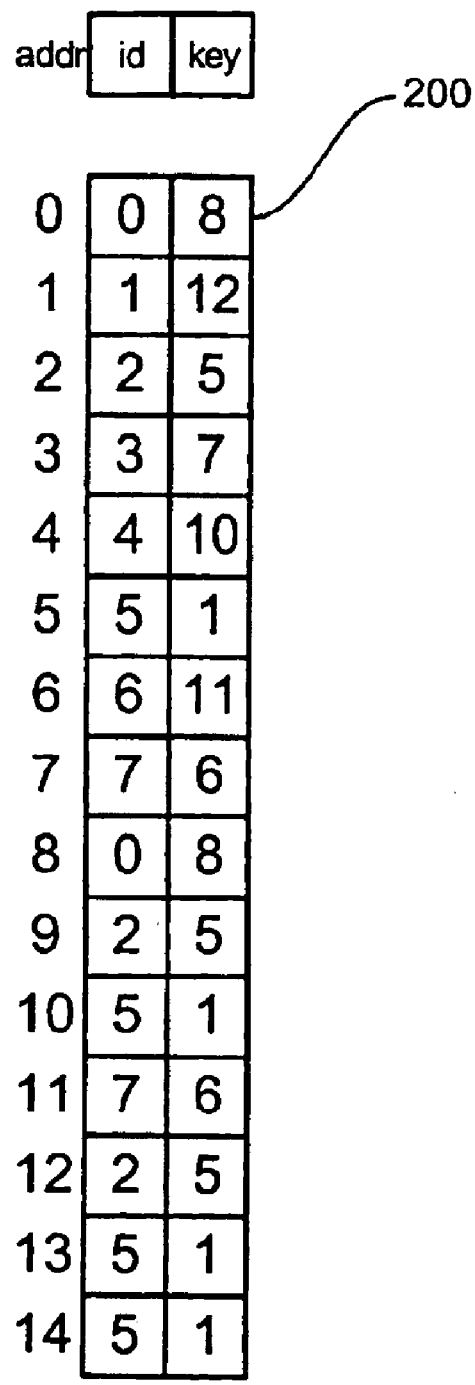
FIG. 2 illustrates mapping of the nodes of the tree of FIG. 1 in a random access memory.

To perform the tournament in hardware, the nodes of the tree are mapped to a table in a random access memory (RAM) as shown in FIG. 2. Here the RAM 200 has 15 locations, addressed 0 to 14, each holding a record that represents one of the fifteen nodes of the tree of FIG. 1. The first eight locations hold records representing the eight leaf nodes and the remaining seven locations hold records representing the seven internal nodes of the tree of FIG. 1. Each record consists of two fields: an ID that identifies the queue (leaf node) that won the current match, and the key (counter value) corresponding to that queue. For each leaf node record, the ID is always the same as the address of the location holding that record.

Figure 4:
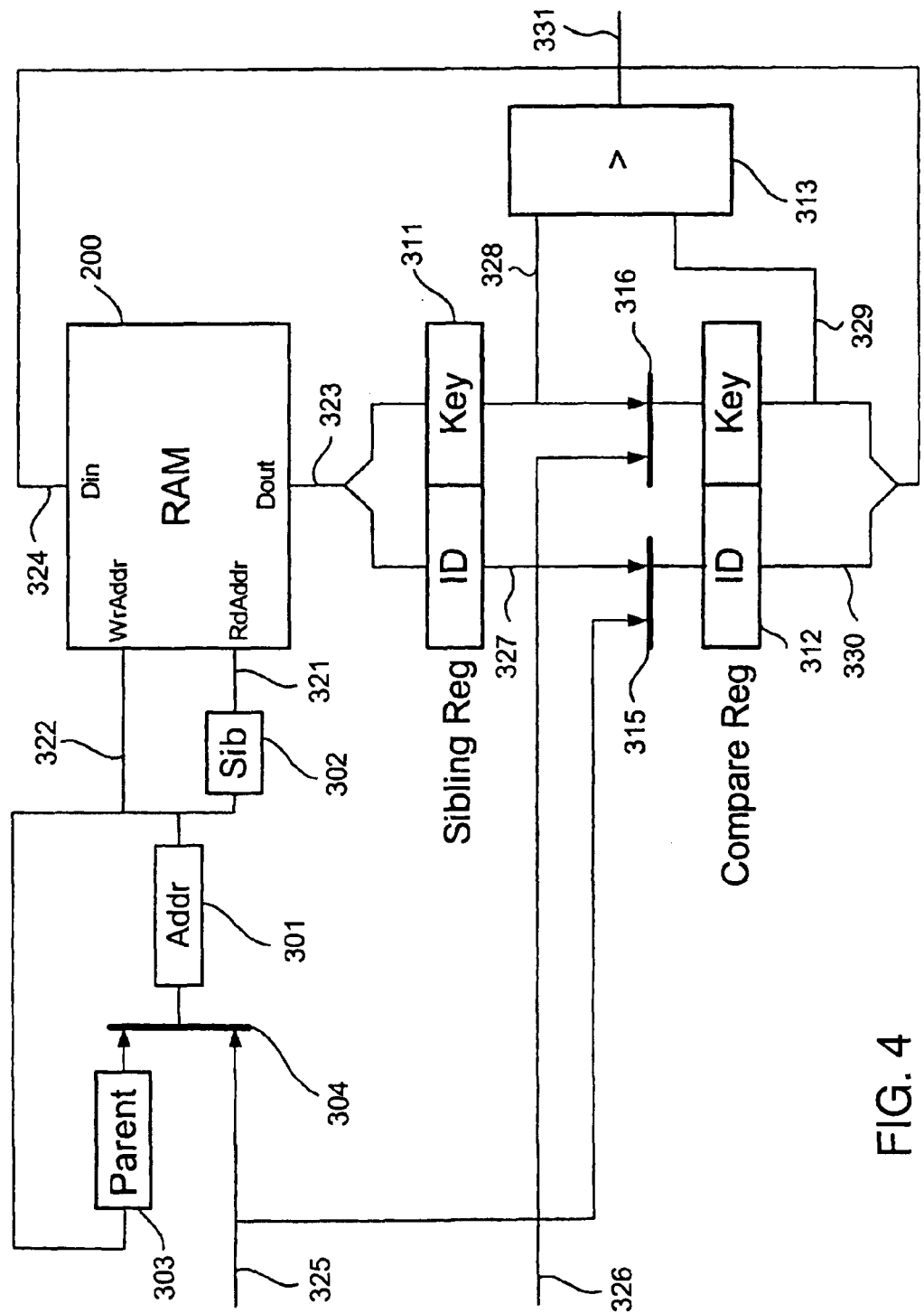
FIG. 4 illustrates hardware for processing the tree structure.

A hardware engine for incrementally performing the tournament is shown in FIG. 4. The ID and key fields of each node record are held in dual port SRAM 200. SRAM 200 has a read port with address 321 and data out line 323 and a write port with address 322 and data in line 324. The engine includes three registers: an address register 301, a compare register 312, and a sibling register 311. The address register 301 holds the address of the node most recently updated. Hereinafter we shall refer to this node as the current node. The compare register holds the ID and key of the current node. The key and ID of the sibling of the current node (the node that shares a parent with the current node) is stored in the sibling register. Hereinafter we shall refer to this node as the sibling node.

Logic for computing the parent and sibling of the current node is associated with address register 301. Because the updated node record in the compare register must be written back to the table at the current node address in the address register, the contents of the address register are used directly as the write address 322 for the RAM 200. To carry out the next match, the sibling of this node must be fetched, so the contents of address register 322 are passed through the sibling function 302 (complementing the least significant bit) to generate the read address 321 for RAM 200. After the current node and the sibling node are compared, the parent of both nodes becomes the new current node and the winner of the match becomes the updated value of this new current node. To compute the address for this step up the tree, the current node address 322 is passed through the parent function 303 (shift right and set most significant bit) to compute the new value for the current node address. Multiplexer 304 is used to load the current node address with the address of a leaf node from line 325 at the start of a new incremental tournament.

Logic associated with the compare and sibling registers is used to initialize the tournament, to perform the key comparisons needed for each match in the tournament, and to update the current node with the ID and key of the winner of each match. Comparator 313 compares the key of the sibling node on line 328 to the key of the current node on line 329. If the sibling key is less than the current node key, line 331 is asserted and the compare register is loaded with the contents of the sibling register at the start of the next cycle.

Multiplexer 315 loads the ID field of compare register 312 with the ID of the queue that has been updated from line 325 at the start of each tournament. Note that this queue ID is also the leaf node address. Hence the same value is loaded into address register 301 at the start of the tournament. Multiplexer 316 loads the key field of the compare register 312 with the updated value of the queue counter at the start of each tournament.

Figure 5:
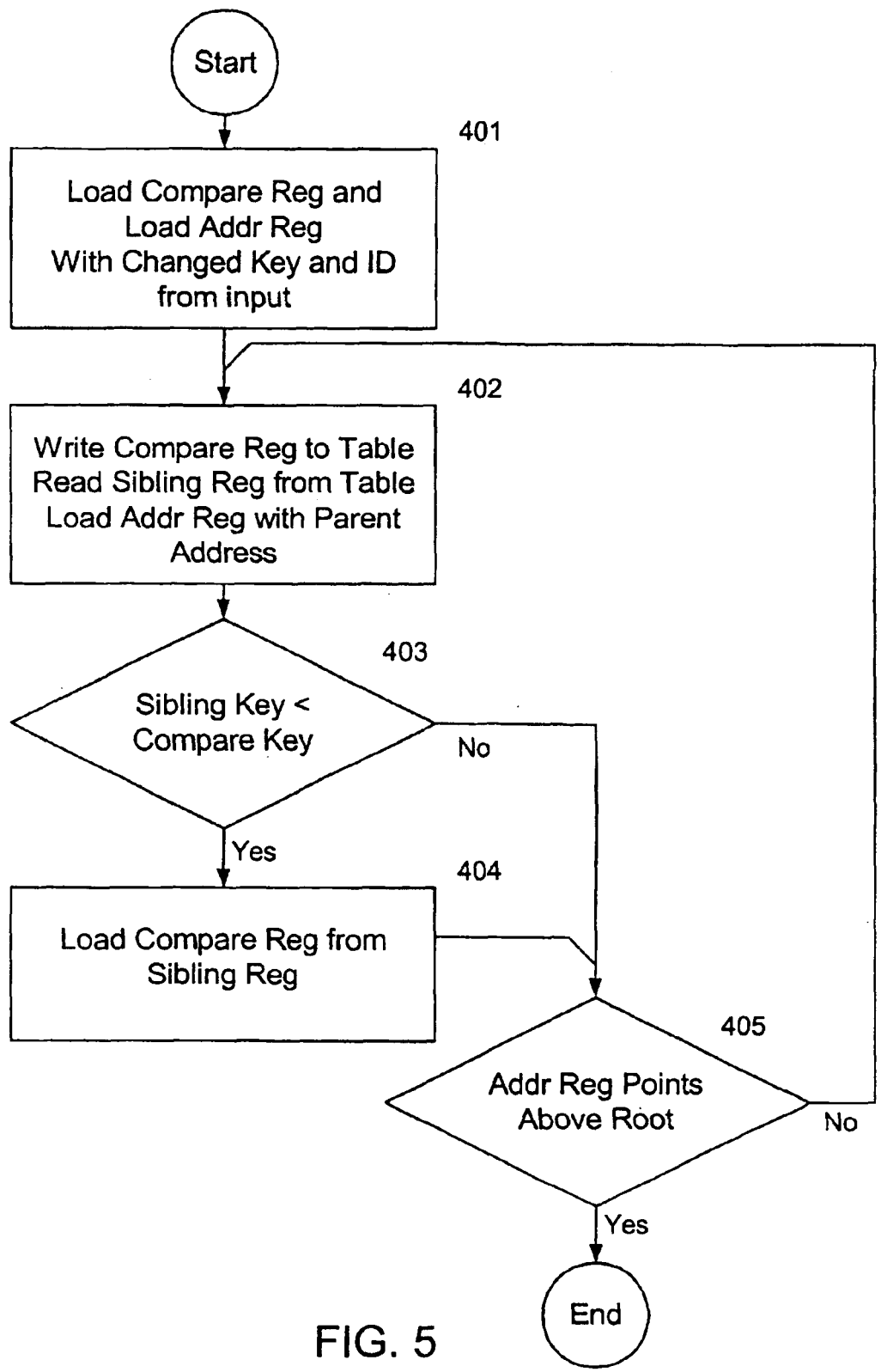
FIG. 5 presents a flow chart for processing the tree structure in the hardware of FIG. 4.
Figure 6:
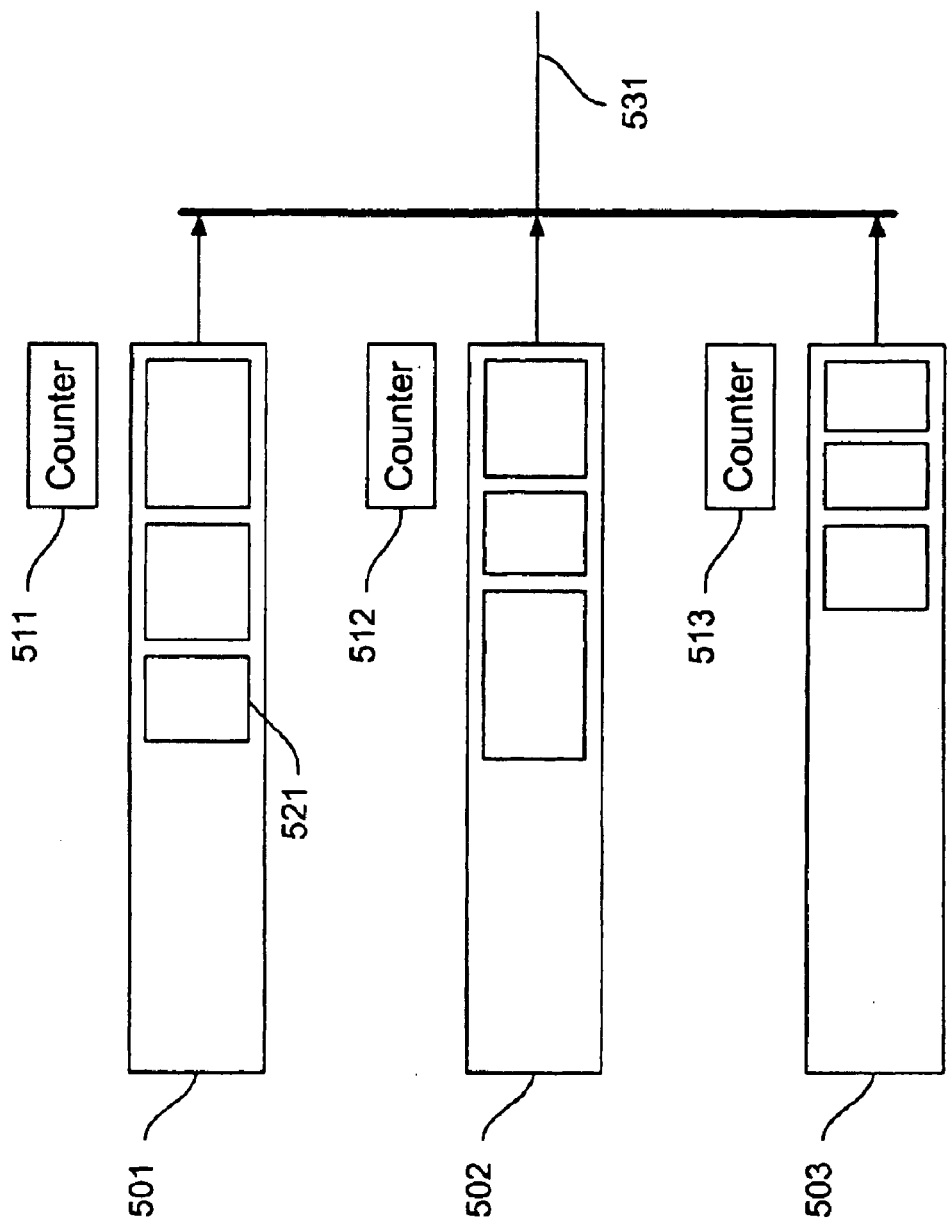
FIG. 6 illustrates a prior art system with three queues which may be modified in accordance with the present invention.

The operation of the tournament sort is described in the flowchart of FIG. 5. The sort begins in box 401 where the compare register 312 and address register 301 are initialized. The ID of the queue whose counter has been updated is loaded into address register 301 via multiplexer 304 and also into the ID field of compare register 312 via multiplexer 315. At the same time, the value of the counter associated with this queue is loaded into the key field of compare register 312 via multiplexer 316.

Once the tournament is initialized, each step up the tree consists of one iteration of the loop consisting of boxes 402 through 405. Although this loop involves four boxes, each iteration takes place in a single clock cycle. First, in box 402, the updated current node in the compare register is stored to the appropriate address in the RAM. This write takes place over the data in line 324 using the write address on line 322. At the same time the node record for the sibling of this node is read from the RAM 200 using the sibling address on line 321. The sibling record appears on the data out line 323 and is loaded into sibling register 311. This register is a transparent latch so that the output of the sibling register is available to the comparator during the same cycle the sibling record is read. One skilled in the art will understand that depending on the logic technology used to implement the engine, the sibling register may be omitted and the sibling record accessed directly from the output line 323 of the RAM 200. Also in box 402, the parent of the current node address is computed and this value is loaded into the address register at the end of the cycle so that it can be used by the RAM 200 on the following cycle.

After the RAM 200 is read and written, the sibling and current nodes are compared and the current node updated accordingly. This process is described in boxes 403 and 404. In decision box 403, the key field of the sibling register 328 and the key field of the compare register 329 are compared by comparator 313. If the sibling key is less than the current node key, the flow proceeds to box 404 and the compare register is updated from the sibling register at the end of the cycle. Box 404 represents the case where the sibling wins the match and thus becomes the new current node. Loading the compare register with the sibling causes the parent node to be written with the winning ID and key on the next cycle, recording the result of the match. If the current node key is lower than the sibling node key, the current node wins the match. In this case the flow skips box 404 and the compare register remains unchanged. This causes the parent node to be written with the value of the current node in the next cycle, again recording the result of the match.

Box 405 checks for completion of the tournament. If, after being updated, the address register points above the root of the table, the tournament is complete and the ID of the winning queue is held in the ID field of the compare register 312 and available on line 330. In our eight queue example, this condition occurs when the address register is updated to the value 15, one beyond the root node at address 14. In general, this termination condition is detected whenever the current node address, viewed as a binary number, is all 1s. If the tournament is not complete, the flow proceeds back to node 402 where the same process is repeated one level up the tree.

Disabling an Empty Queue

Figures 7, 8:
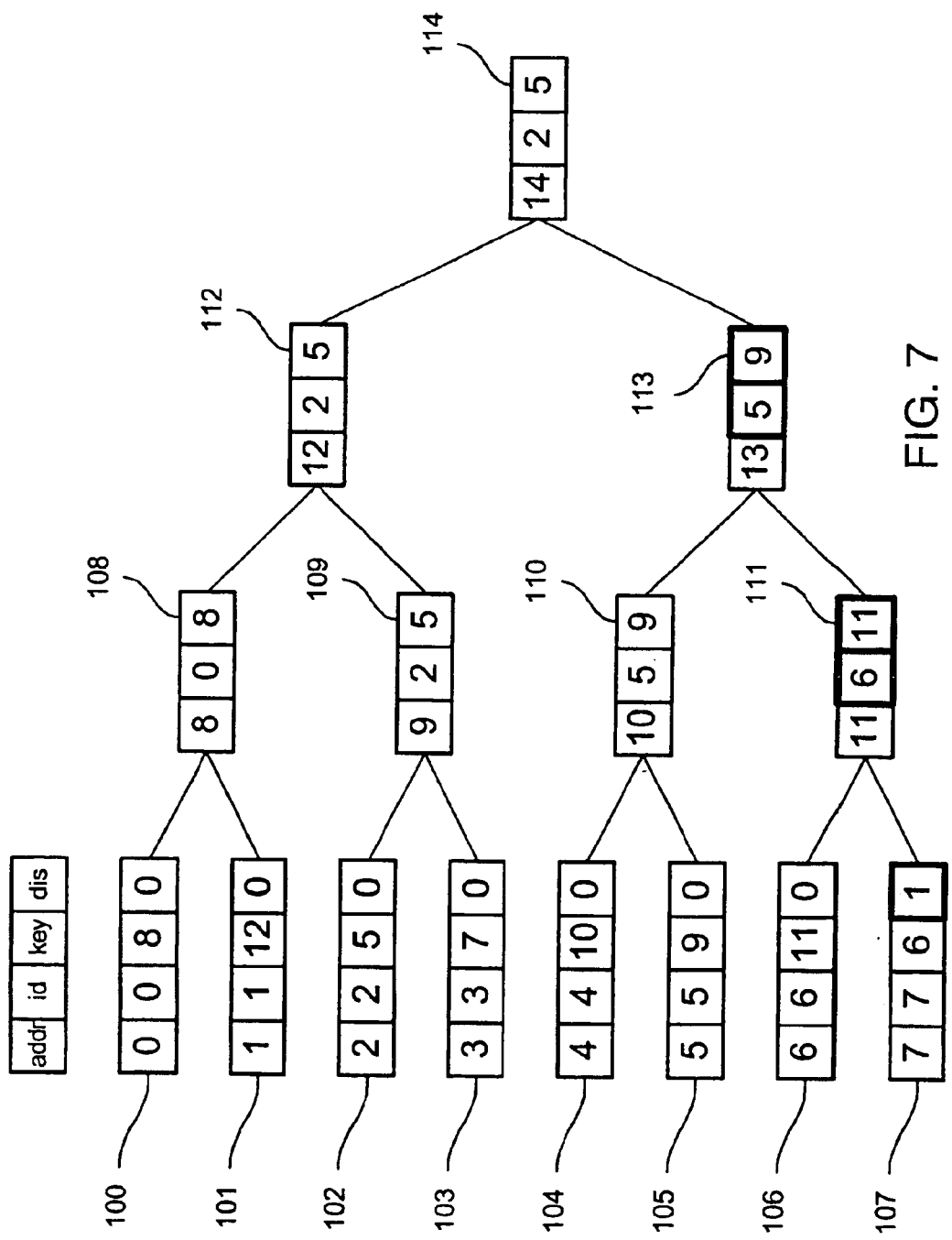
FIG. 7 illustrates a tree structure embodying the invention with the addition of a disable field to each leaf node.

When a queue becomes empty, it must be disabled from competing in the tournament because it is not able to provide a packet to be output in the event that it wins. This could be accomplished by setting its counter to the largest possible value. However, that solution is not viable because the counter value must be preserved to determine when the next packet to arrive is scheduled to depart from the queue. A workable solution, illustrated in FIG. 7, is to add a single bit disable field to each leaf node of the tournament tree. When this bit is set, the node is treated as if the key had the largest possible value (all 1s in a binary representation) and hence loses all matches against enabled nodes. When a packet arrives at the empty queue, making it non-empty, the disable field is cleared and an incremental tournament is performed using the preserved counter value to update the state of the tree.

FIG. 7 shows an example of a queue 7 being disabled in the tree of FIG. 3. Leaf node 107, corresponding to queue 7 has its disable bit set and hence loses the match against leaf node 106. The results of this match are recorded in intermediate node 111 and this result propagates up the tree, updating intermediate node 113. If the disable bit of leaf node 107 is cleared before any other state in the tree is changed, the match between nodes 107 and 106 will be rerun using the actual counter values. The result of this match will then be propagated up the tree returning it to the state of FIG. 3.

Pipelined Packet Scheduling Engine

Figure 8A:
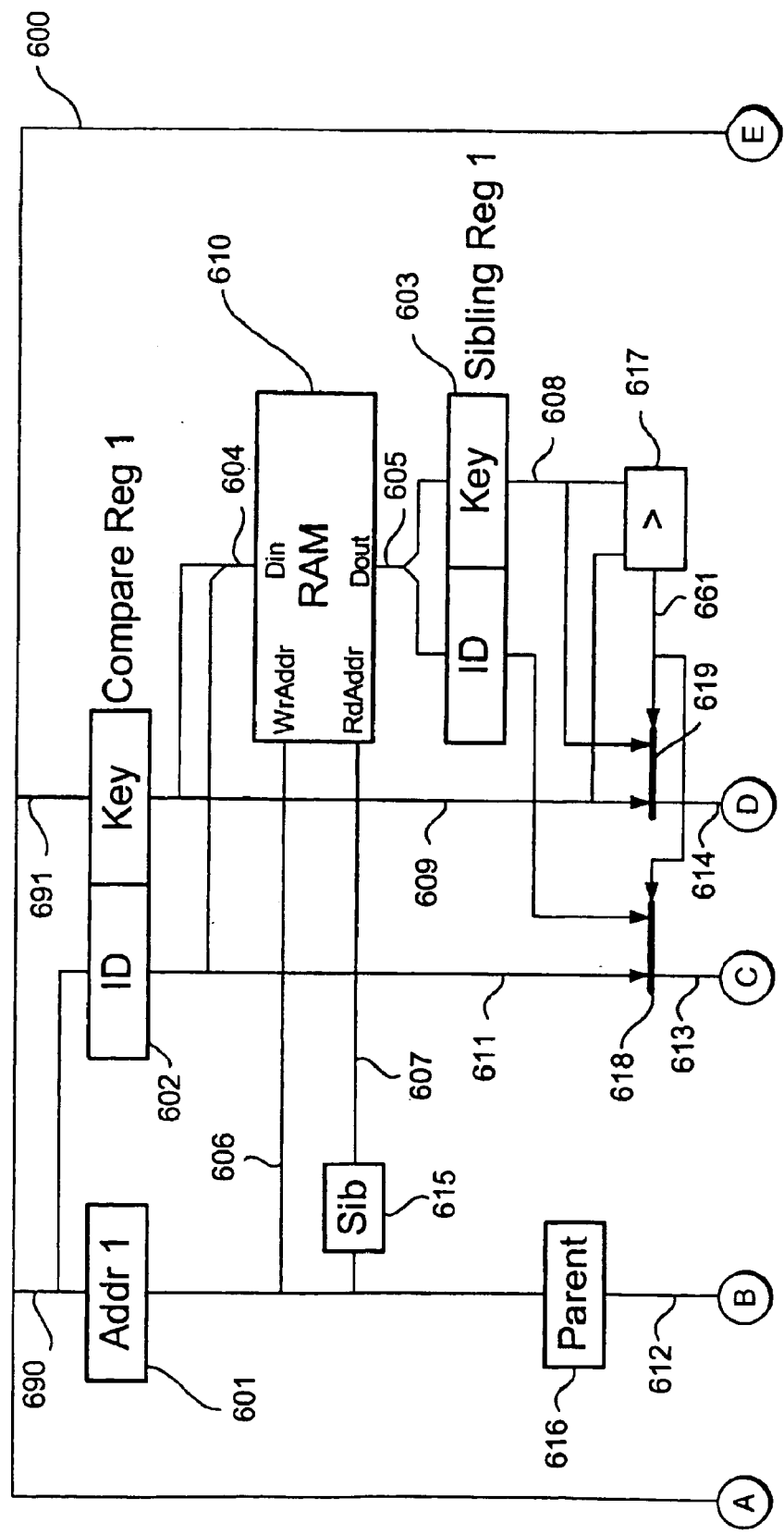
FIGS. 8A, 8B and 8C illustrate the hardware for implementing the tree structure in a pipeline architecture.
Figure 8B:
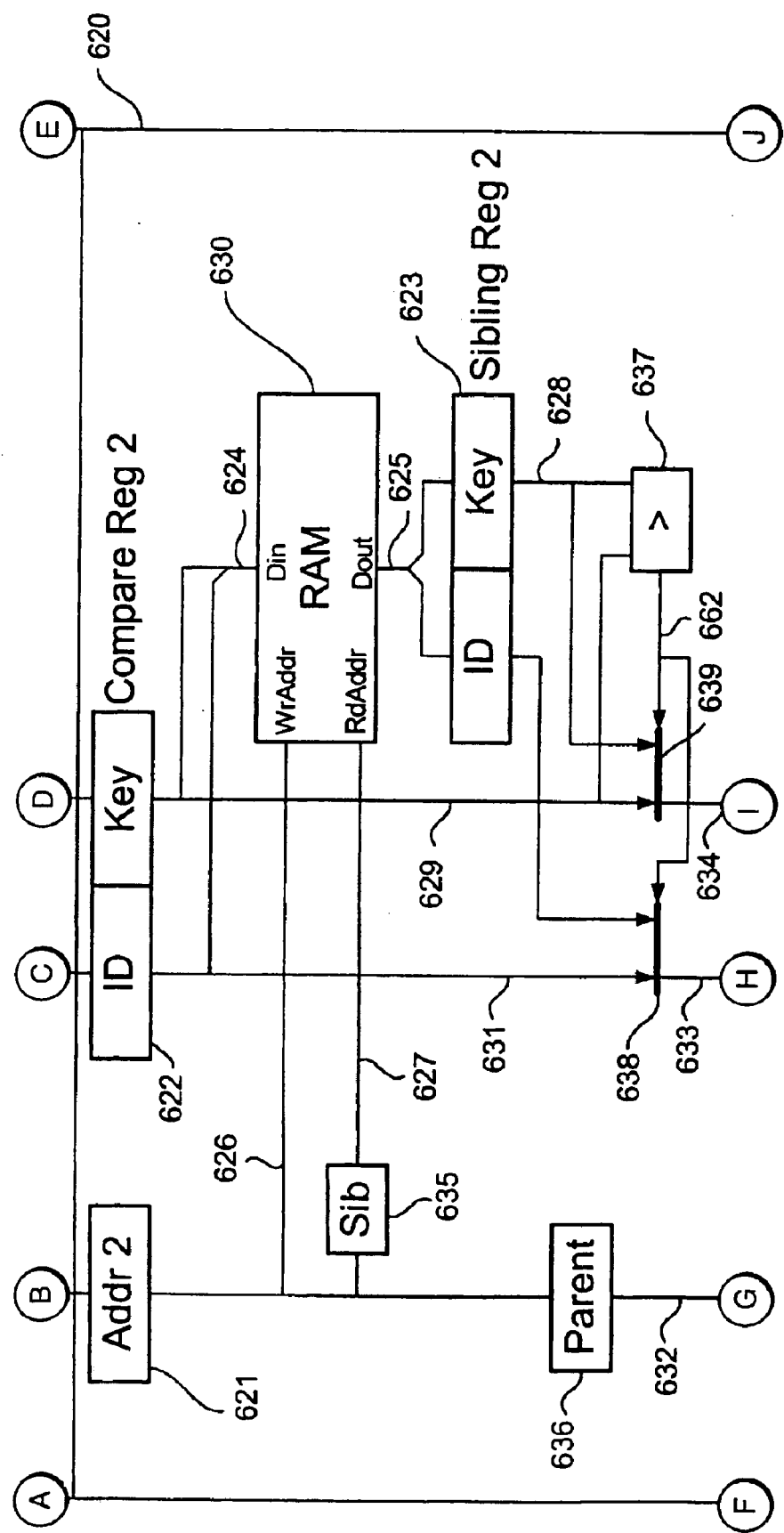
Figure 8C:
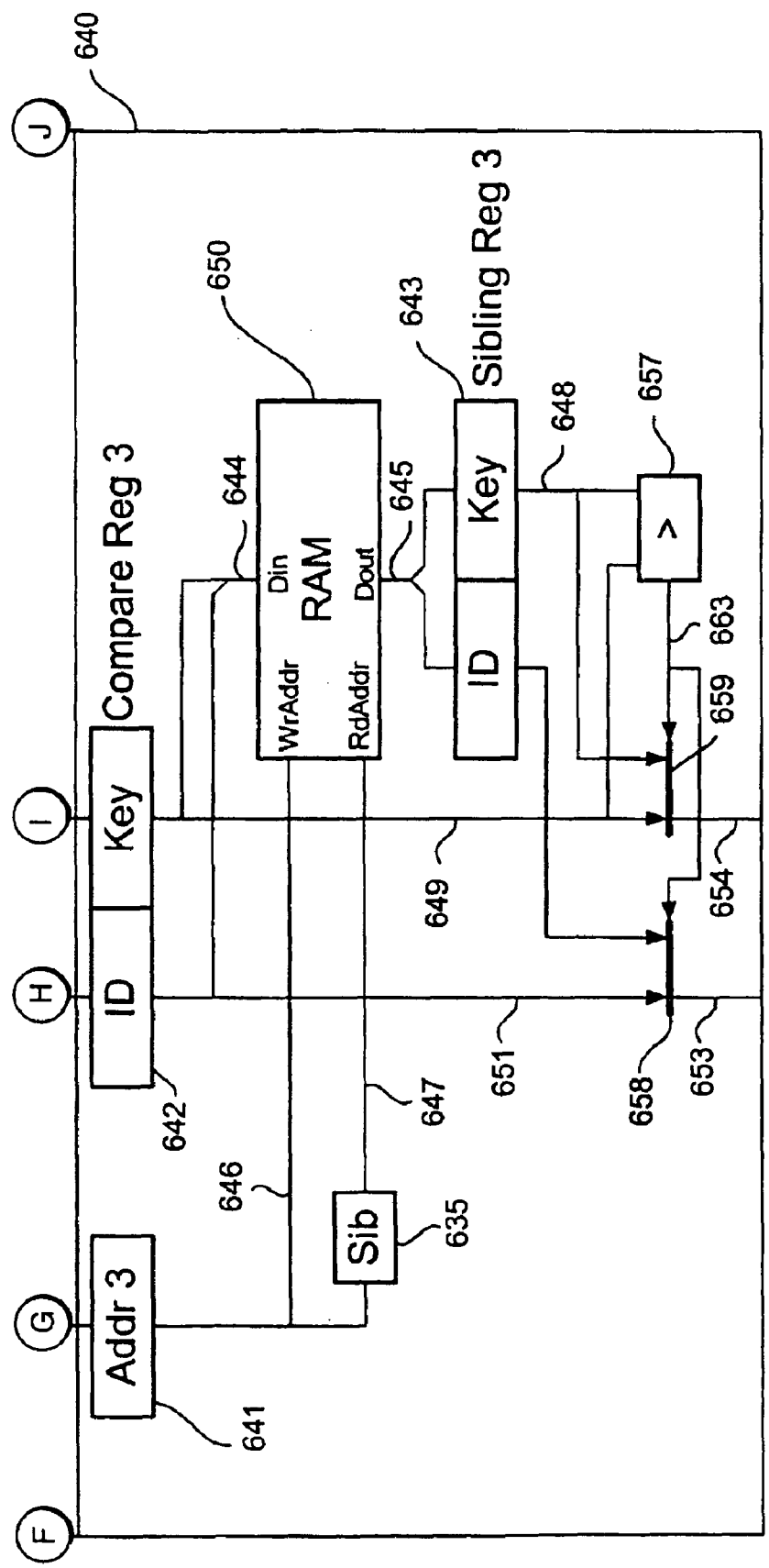

At very high line rates, it is not sufficient to complete one incremental tournament every three cycles using the hardware of FIG. 4 (or one tournament every 12 cycles for 4096 queues). A higher rate of packet scheduling, one packet per cycle, can be achieved by pipelining the tournament sort as illustrated in FIGS. 8A–C. The circuit of FIGS. 8A–C consists of three pipeline stages, 600, 620, and 640. Each pipeline stage includes all of the logic of the tournament sort engine of FIG. 4, but operates only on one level of the tree. The table 200 holding the node states is partitioned across the three pipeline stages. The leaves of the tree, locations 0–7, are held in RAM 610 in pipeline stage 600. The first level of internal nodes, locations 8–11, are held in RAM 630 in pipeline stage 620, and the second level of internal nodes, locations 12–13, are held in RAM 650 in pipeline stage 640. Note that there is no need to store the root of the tree, location 14, as the winning node ID and key are output on lines 653 and 654 respectively.

Consider, for example, starting with the initial state shown in FIG. 1 and changing the counter associated with queue five to 9, as was done in FIG. 3. The pipelined circuit of FIGS. 8A–C computes the incremental tournament associated with this change in three cycles. At the start of the first cycle, address register 601 is loaded with the address/ID of the leaf node 5 over line 690. At the same time, the ID portion of compare register 602 is loaded with the same value, and the key portion of compare register 602 is loaded with 9, the new value of the queue's counter over line 691. During the first cycle, 5.9, the new entry for leaf node 5, is written to location 5 in RAM 610 using write address port 606 and write port 604. Also during this cycle, the record for the sibling of this node, node 4, is read from RAM 610 using read address port 607 and read data port 605. In the example, this value of this record is 4.10 (ID=4, key=10). Read address 4 on line 607, is generated using the sibling unit 615 that complements the least-significant bit of current-node address 5 on line 606. Once the sibling record 4.10 has been read from RAM 610, it is held in sibling register 603. One skilled in the art will understand that if RAM 610 provides a static output, the value of the sibling record can be accessed directly from the RAM output port 605 and no sibling register is required. In either case, the key field of the sibling record 10 on line 608, is compared to the key field of the current record, 9 on line 609, by comparator 617. The output of the comparator 661 controls multiplexers 618 and 619 to select either the current record 5.9 from the compare register 602 or the sibling record 4.10 from sibling register 603 to be output to the next stage on lines 613 and 614, for the ID and key fields respectively. In this case, 9 is less than 10, so the comparator selects 5.9 from the compare register to be output. In parallel with this selection, parent logic 616 computes the address of the node to be accessed in the next stage 10 by shifting the current address on line 606 right and setting the most significant bit. This address is output to the next stage on line 612.

During the second cycle, the second stage of the pipeline 620, updates internal node 110 in the second rank of the tree and computes the winner of the match between nodes 110 and 111 in a similar manner. At the start of the cycle, the node address, 10 on line 612, is loaded into address register 621 and the winning node record from the last stage, 5.9 on lines 613 and 614, is loaded into compare register 622. RAM 630 then reads the sibling record 7.6. The comparator compares the keys of the sibling and current records and selects the record with the lowest key to be output on lines 633 and 634. In this case the sibling record, 7.6, is output.

At the same time, parent logic 636 computes the address of the parent of node 10, in this case, node 13 and outputs this value on line 632.

The final pipeline stage 640 operates in a similar manner. It takes the node address 13, updates the node with its new record, 7.6, reads its sibling record, 2.5, compares the keys, and outputs the winner, 2.5.

Figure 10:
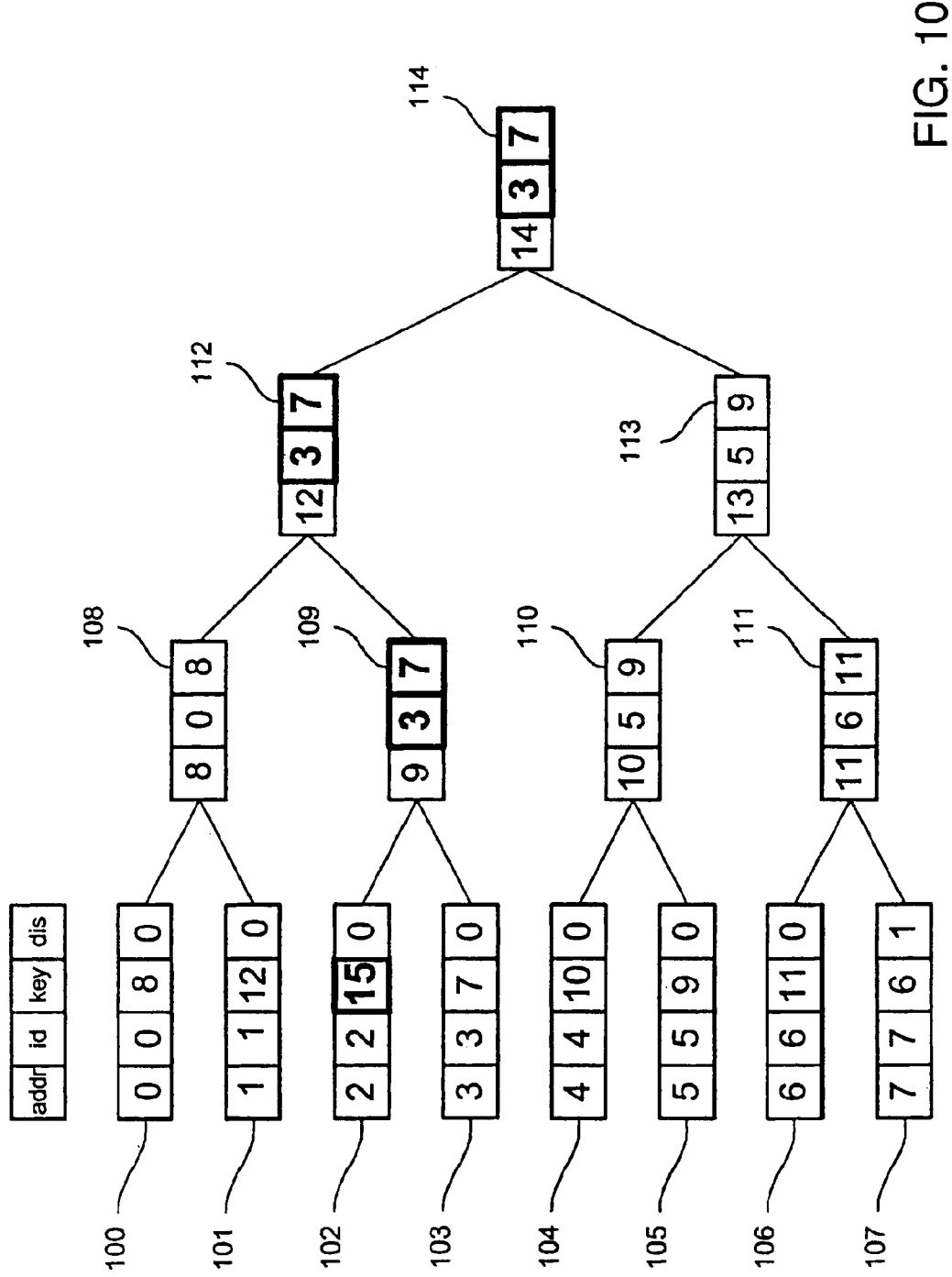
FIG. 10 presents the tree structure resulting from the data of FIG. 9.

The pipelined scheduling engine of FIGS. 8A–C computes a single incremental tournament in the same amount of time as the iterative engine of FIG. 4. However, its advantage is that it can start a new incremental tournament each cycle. An example of this pipelined operation is illustrated in the table of FIG. 9. The figure shows the contents of each register in the circuit on a different row as a function of time. Each timestep is shown in a separate column. The figure shows three incremental tournament computations: changing the counter of queue 5 to 9 (as shown in FIG. 3), marking queue 7 disabled (as shown in FIG. 7, in FIG. 9 the disabled state is denoted by the letter d), and finally changing the counter of queue 2 to 15 (as shown in FIG. 10).

Each of these tournaments is started in successive cycles: 5.9 in cycle 1, 7.d in cycle 2, and 2.15 in cycle 3, and each tournament takes three cycles to complete. A given tournament advances from one pipeline stage to the next on each cycle. The bold lines in FIG. 9 show this advancement for tournament 5.9. Because this tournament advances to the second pipeline stage on cycle 2, the first pipeline stage is freed to start the next tournament, 7.d in this example. Similarly the first tournament vacates the second pipeline stage at the start of cycle 3, allowing the second tournament to proceed to the second stage during that cycle. In this manner, the pipelined organization enables a new tournament to be started each cycle with each tournament completing three cycles after it starts. In the preferred embodiment with 4096 queues, the pipeline has 12 stages and each tournament finishes 12 cycles after it starts.

One skilled in the art will understand that the iterative engine of FIG. 4 and the fully-pipelined engine of FIGS. 8A–C are two extreme points on a continuum of design possibilities. With 4096 queues, for example, one could alternatively employ a six-stage pipeline where each stage handles two levels of the tree and performs two iterations before passing its result on to the next stage. Other combinations (e.g., four stages that perform three iterations each, three stages that perform four iterations each, or two stages that perform six iterations each) are also possible to trade off implementation complexity against performance.

Packet Scheduling using a Sorting Network

Figure 11:
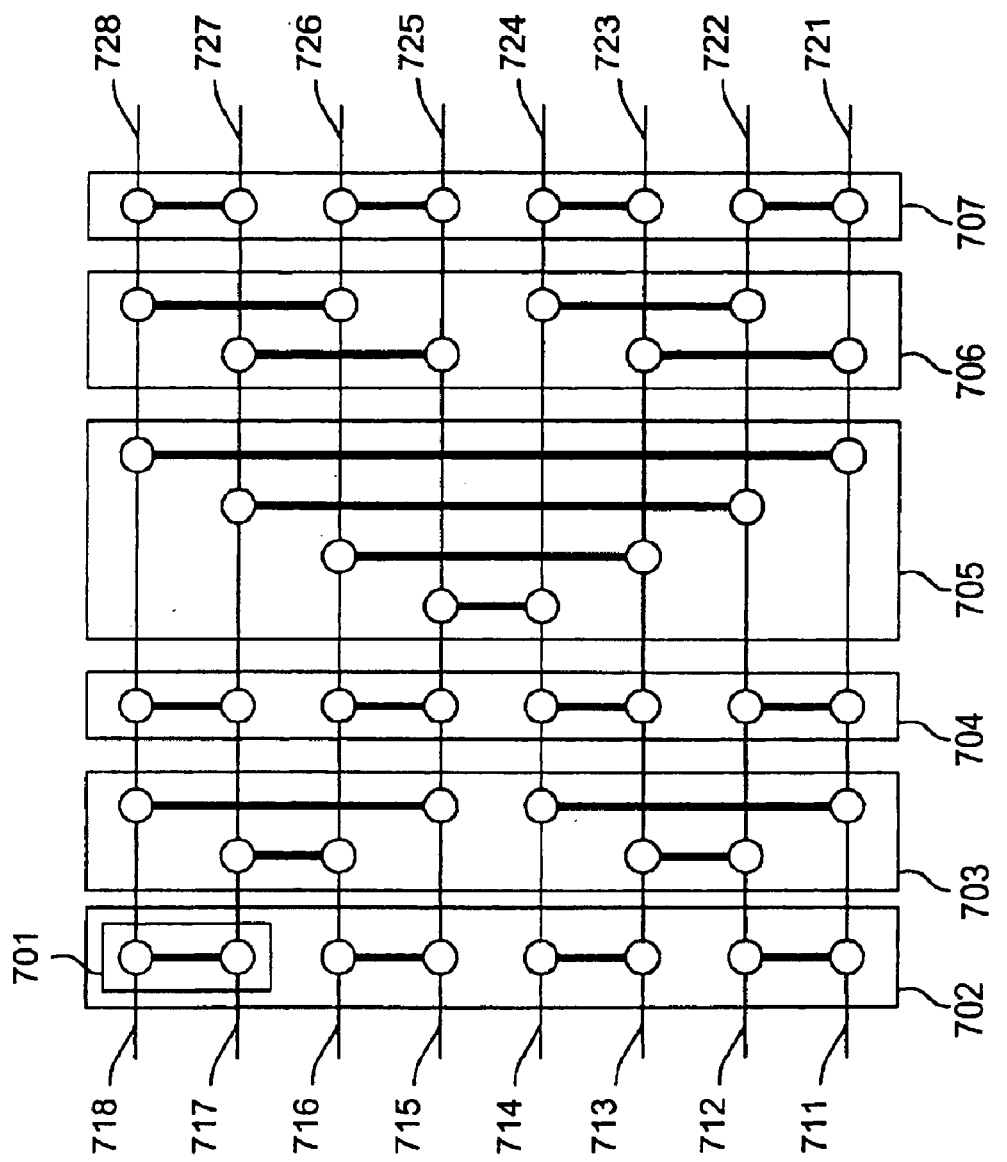
FIG. 11 illustrates a sorting network in an alternative embodiment of the invention.

An alternative method of fast packet scheduling employs a sorting network as illustrated in FIG. 11. The sorting network accepts a set of eight queue ID/key pairs on its input lines 711–718 and sorts these records in order of descending key magnitude on output lines 721–728.

For eight inputs, the sorting network consists of six stages 702–707 each containing four comparison exchange units. In general, a network with $2^n$ inputs requires 2n stages each containing $2^{n-1}$ comparison exchange units. Two circles connected by a thick line denote each comparison exchange unit, e.g., 701. This unit accepts two inputs on its left terminals, compares the key fields of the two inputs, and exchanges the inputs if necessary so that the record with the lesser key is output on the upper right terminal and the record with the greater key is output on the lower right terminal.

To allow the sorting network to handle a new set of updates each cycle, it can be pipelined in the same manner as the tournament search engine of FIGS. 8A–C, with each stage of the sorting network completing its comparisons and exchanges in a given clock cycle. Also, to reduce hardware complexity, the sorting network may be updated in an incremental manner by using only a single comparison exchange unit for each stage and operating it on only the input pairs that have changed in that stage.

One skilled in the art will understand that the sorting network of FIG. 11 is an eight-input Batcher sorting network. This network can be extended to larger numbers of inputs, for example a 4096-input network with 24 stages of 2048 comparison exchange units. Also, other sorting networks (for example those described in Chapter 28 of Cormen, Leiserson, and Rivest, *Introduction to Algorithms*, MIT Press, 1990) may be substituted for the Batcher network.

A scheduler using a sorting network has both higher hardware complexity and higher performance than a scheduler using a tournament tree. Using a sorting network, multiple packets may be scheduled in a single cycle by selecting the top several outputs of the sorting network. Also, several queue counters may be updated in a single cycle as a complete sort is performed on each update, rather than the incremental sort performed on the tournament tree.

Combined CBR and WFQ Scheduling

In the preferred embodiment, each queue is associated with two counters. The first counter, STT, holds the scheduled transmission time for the packet according to a constant-bit-rate (CBR) service guarantee. The second counter, TTT, holds the theoretical transmission time for the packet to compete on a best-efforts basis against other best-efforts traffic using a weighted-fair-queuing (WFQ) policy. Associated with each counter is a disable bit that can be used to disable the counter from participating in a tournament as illustrated in FIG. 7. Thus, for a given queue, if the WFQ disable bit is set, packets in that queue are scheduled according to a CBR service guarantee. If the CBR disable bit is set, packets in the queue compete for any bandwidth remaining after all CBR packets have been scheduled using a WFQ policy. If both disable bits are clear, packets are first scheduled according to a CBR service guarantee. Then, if any channel bandwidth remains after satisfying all CBR traffic, packets in the queue compete with best-efforts traffic for the remaining bandwidth using a WFQ policy. Finally, if both disable bits are set, the queue is disabled and no packets will be scheduled.

Figure 14:
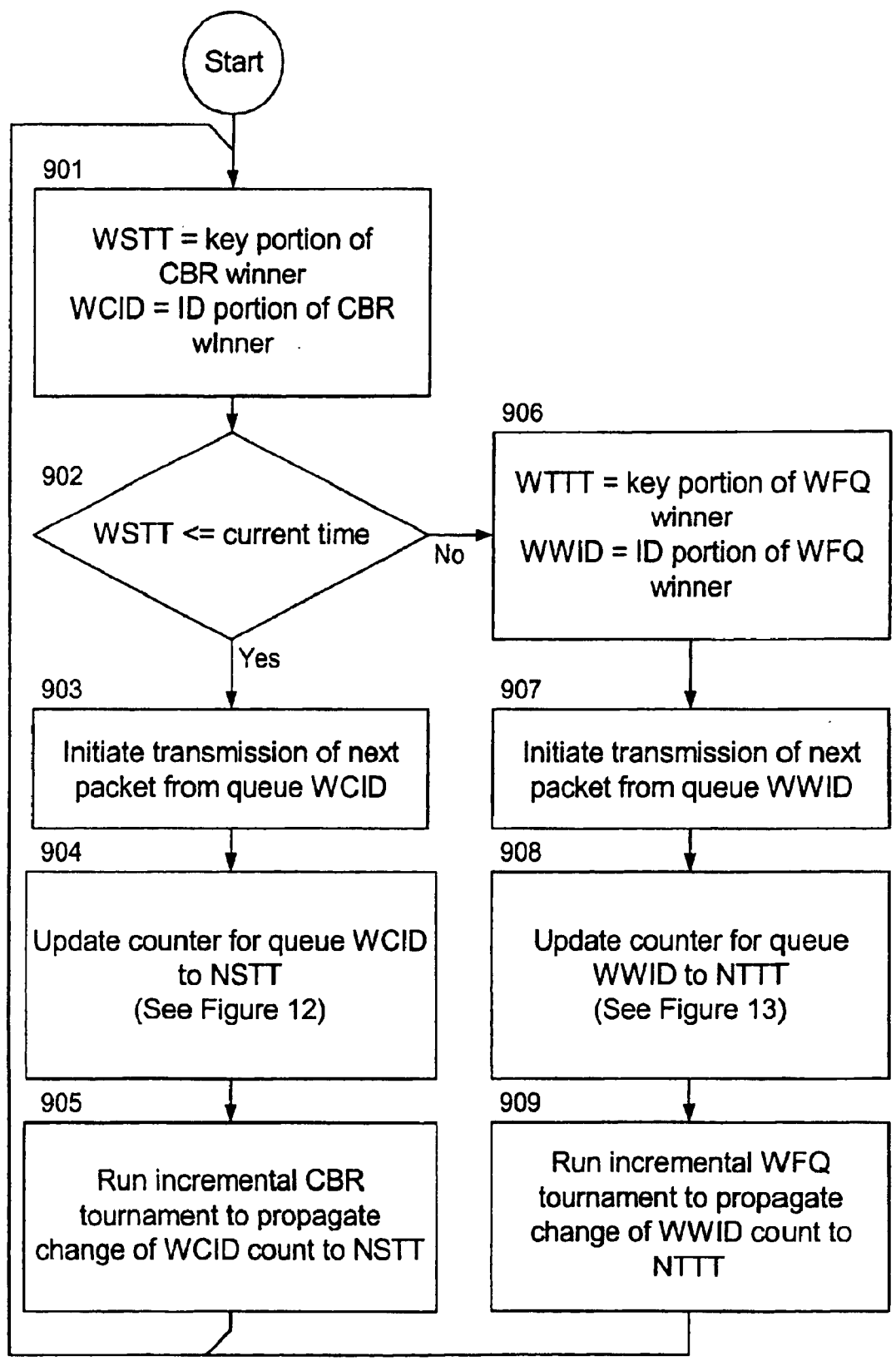
FIG. 14 is a flow chart of a tournament using both CBR and WFQ scheduling.

To implement this dual scheduling policy two tournament trees are maintained. One tree uses the STT counter for each queue as the key while the other tree uses the TTT counter as the key. During each scheduling interval, the next packet to be transmitted is selected as shown in the flowchart of FIG. 14. The process starts in box 901 where the winner of the CBR tournament is examined. The key of the winner is denoted WSTT (the winner's STT) and the queue ID is denoted WCID (winner of CBR tournament ID). If WSTT is less than or equal to the current time, a packet in the winning CBR queue is eligible for transmission and control proceeds to boxes 903–905 to transmit this packet and update the scheduling state accordingly. If WSTT is greater than the current time, no CBR packet is currently eligible for transmission and control proceeds to boxes 906–909 where a best-efforts packet is selected.

Figure 12:
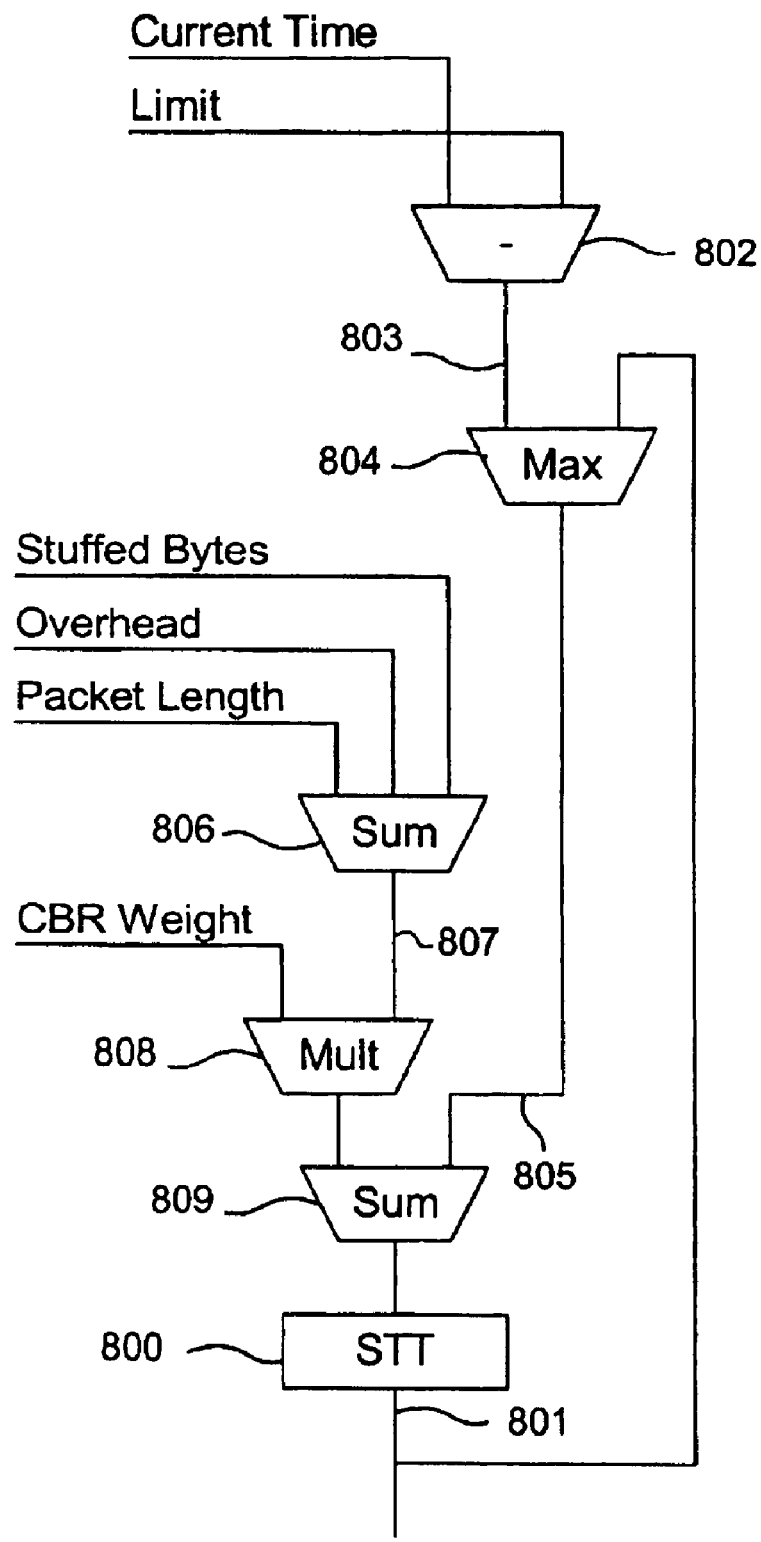
FIG. 12 illustrates a circuit for updating a CBR counter.

In the case where WSTT is less than or equal to the current time, transmission of the packet at the head of queue WCID is initiated in box 903. This packet is the CBR packet with the earliest STT and hence should be the first packet to be transmitted over the line. After packet transmission has been started, the STT for this queue is updated to reflect the bandwidth resources consumed by this packet transmission in box 904. The new STT for this packet is denoted NSTT. The details of this computation are shown in FIG. 12 and described below. In box 905, the CBR tournament is updated to reflect the new STT for queue WCID. This update may be done using either the iterative circuit of FIG. 4 or the pipelined circuit of FIGS. 8A–C. Once the incremental tournament is complete and the transmission of the packet is complete, control returns to box 901 to decide which packet to send next.

If no CBR packet is eligible for transmission at the present time, WFQ scheduling is performed starting in box 906 where the winner of the WFQ tournament is examined. The key of the winner is denoted WTTT (winner's TTT) and the ID of the winner is denoted WWID (winner of WFQ tournament ID). Control then proceeds as on the CBR path. The winning WFQ packet is transmitted in box 907. This is the best-efforts packet scheduled to get the next available portion of available bandwidth according to the WFQ scheduling algorithm. In box 908 the TTT for the winning queue is updated. The details of this TTT update computation are shown in FIG. 13 and described below. An incremental tournament is performed on the WFQ tree in box 909 to update the tree with the new TTT for queue WWID. Finally, after both the tournament and the packet transmission are complete, control returns to box 901 to schedule the next packet.

The same hardware can be used to perform both the WFQ tournaments and the CBR tournaments. During a given scheduling interval one tournament or the other is performed. There is never a need to perform both tournaments simultaneously. To support both tournaments in a single sorting engine, each RAM (200 in FIG. 4 or 610, 630, and 650 in FIG. 8C) is doubled in size to hold the trees for both tournaments and the high address bit is used to select the active tournament.

Variable Packet length Scheduling with Byte Stuffing

FIG. 12 shows the logic used to compute the new STT after a packet has been transmitted according to a CBR service contract. The logic follows that of an ATM 'leaky-bucket' traffic shaping algorithm (c.f., Ferguson and Huston, *Quality of Service*, p. 65) augmented to handle variable length packets and bit-stuffing by the physical layer. The logic begins by subtracting a preset limit from the current time in subtractor 802. The result of this subtraction on line 803 is compared against the current STT on line 801 in maximum unit 804 and the larger of the two is output on line 805 to be used as the baseline from which the new STT is computed. By limiting this baseline to be no less than a preset limit before the current time, a flow that goes idle for a period of time is prevented from oversubscribing the output line until it has caught up with the present time. In effect, the burstiness of a flow is limited to the ratio of the Limit to the CBR Weight. This ratio represents the number of bits that a queue can bank while it is idle and expend in a burst catching up with current time.

The baseline STT on line 805 is incremented by the amount of time that it would take to transmit the current packet, including all overhead, at the constant bit rate. First, two forms of overhead are added to the packet length in adder 806 to yield the total packet length on line 807. The first form of overhead is the constant overhead required per packet for header and framing information. The second form of overhead is physical layer overhead due to the byte stuffing required by some physical layers. Each queue keeps a count of the number of bytes stuffed when transmitting each packet and adds this count as the second form of overhead when the next packet is transmitted. Keeping this running count allows byte stuffing to be accurately accounted for in the CBR metering for the queue even though the number of bytes stuffed for a given packet is not known until the packet is transmitted.

The total packet length on line 807 is then multiplied by the CBR Weight in multiplier 808 to yield the time interval required to transmit the packet, with all overhead, at the guaranteed bit rate. The CBR Weight is the reciprocal of the guaranteed bit rate expressed as a fraction of the output trunk bit rate. That is CBR Weight=output trunk bit rate/constant bit rate. Once the time interval is computed by multiplier 808, it is added to the baseline STT by adder 809 and the resulting new STT is stored in per-queue register 800.

The computation of the new TTT for a queue scheduled using weighted-fair-queuing is shown in FIG. 13. The computation proceeds in a manner similar to the weighted-fair-queuing algorithm (c.f. Zhang, "Service Disciplines for Guaranteed Performance Service in Packet-Switching Networks," *Proceedings of the IEEE,* 83(10), October 1995.) augmented to handle variable packet length and packet overhead in a manner similar to that for the CBR algorithm described above. Overhead is added in adder 820, and the total packet length is multiplied by the WFQ weight in multiplier 822. The output of multiplier 822 is added to the baseline TTT by adder 824, and the new TTT is stored in per-queue register 826.

Alternative Tournament Sort

Figure 16:
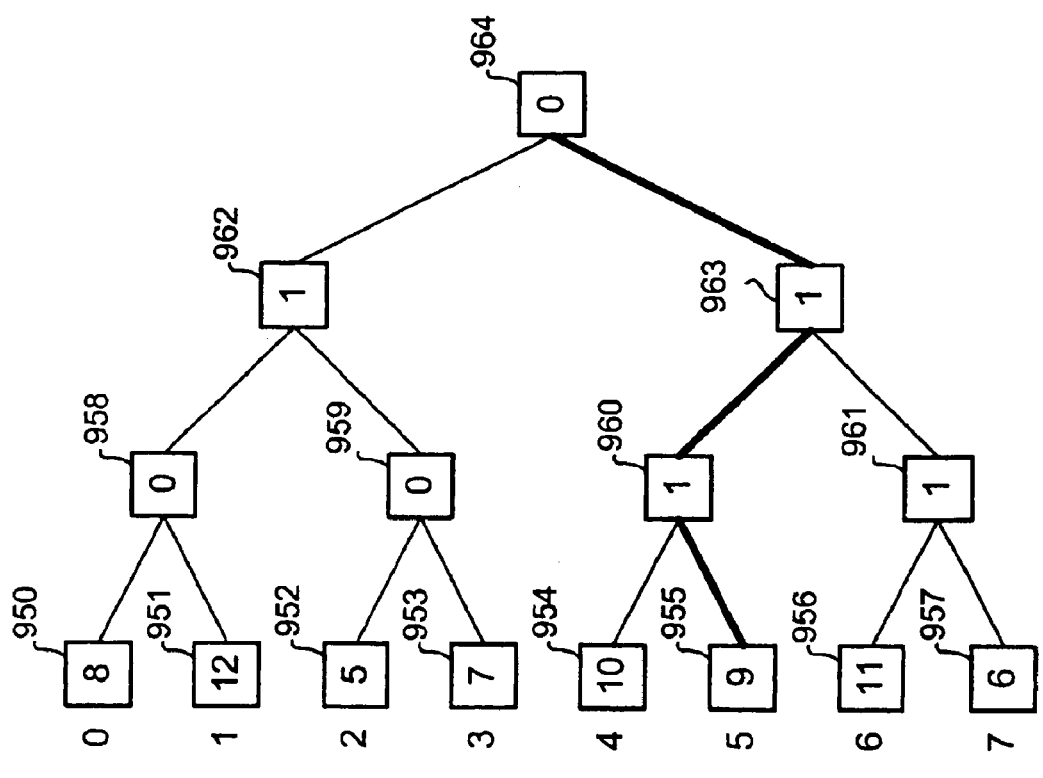
FIG. 16 illustrates the tree structure of FIG. 15 after the value of node 955 is changed.
Figure 15:
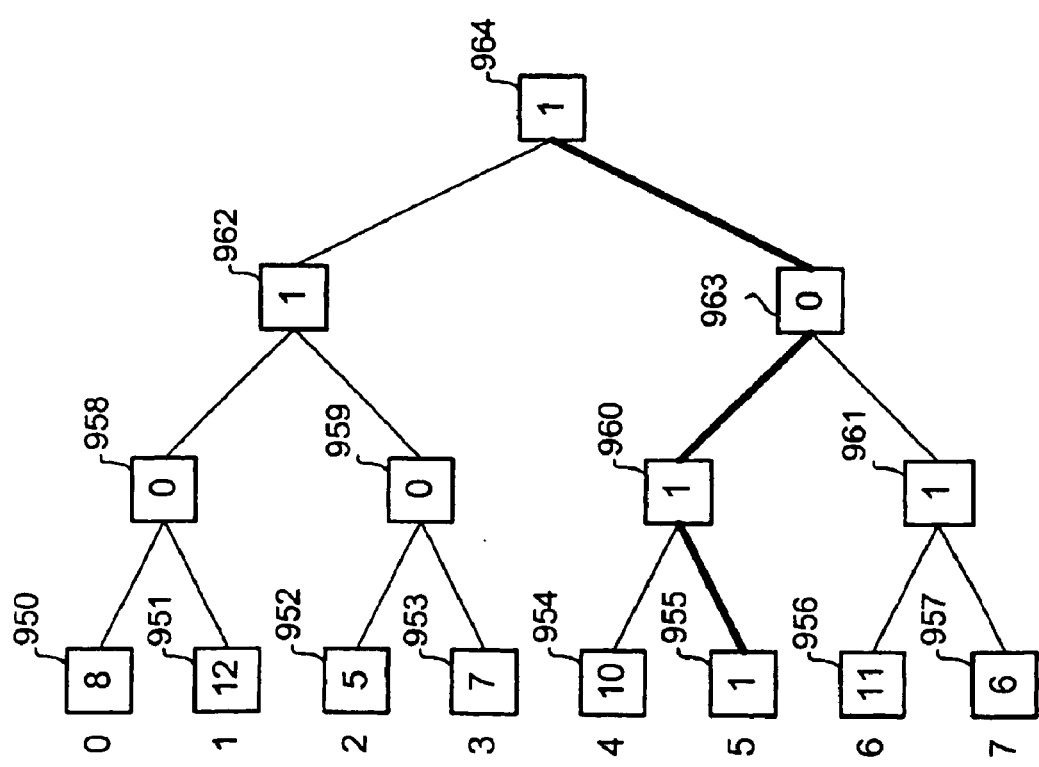
FIG. 15 illustrates an alternative embodiment of the tree structure in which the counter values are stored only in the leaf nodes.

An alternative embodiment of the tournament sort algorithm involves storing just the outcome of each match at each internal node of the tree. This is in contrast to storing the ID and key of the match winner at each internal node. This alternative embodiment is illustrated in FIGS. 15 and 16. FIG. 15 illustrates a tournament tree representing the same tournament as FIG. 1, but with just the outcome of each match stored at each internal node. For example, the match between leaf nodes 950 and 951 is won by the upper node 950, so a 0 is stored at internal node 958. The match between internal nodes 958 and 959 is won by the lower node 959, so a 1 is stored at internal node 962, and so on.

The ID and key associated with any node of the tree of FIG. 15 may be identified by following a path from the node to the winning leaf. At each step of the path the upper child is selected if the node holds a 0 (indicating that the upper child won the match) and the lower child is selected if the node holds a 1 (indicating that the lower child won the match). For example, the ID and key associated with the tournament winner, node 964 is identified by following the bold path in the tree to node 955 with ID 5 and key 1. Note that the state of the internal nodes traversed along this path also gives the ID of this node $101_2=5$. The ID corresponding to the winner of any match can be quickly generated using multiplexers to select the appropriate internal node values along the specified path.

When a leaf node is updated, the tournament sort is incrementally recomputed in a manner similar to that described above. For example, consider the case illustrated in FIG. 16 where the count or key associated with node 955 is changed from 1 to 9. Each match along the path from node 955 to root node 964 must be recomputed in sequence. First, the ID of the competitor for the first level match, 4, is computed by complementing the LSB of 5. The match between the key of node 955, 9, and the key of node 954, 10, is then run with 955 being the winner. Internal node 960 is updated to a 1 to record the result of this match. Next the ID of the competitor for the second level match is computed by following the path from node 961, the sibling of 960, to its winning leaf node, 957, with ID 7 and key 6. Here 957 wins the match, so internal node 963 is updated to a 1 to record this result. The competitor for the final match is identified by following the path from node 962, the sibling of 963, to its winning leaf node, 952. In this case, 952 wins the match so root node 964 is updated to a 0 to record this result. Note that at the completion of the match, the path from 964 to leaf node 952 has values 010, the ID of leaf node 2 in binary.

The hardware engines of FIGS. 4 and 8A–C can be easily adapted to this alternative tournament search where only the result of each match is stored in the tree. The adaptation is performed by reducing the size of the RAMs to hold only the leaf nodes, adding a flip-flop array to hold the values of the internal nodes, and adding a set of multiplexers to compute the ID of match winners from the state of the flip flops. The RAM need not have a separate write port as it is written only at the beginning of the tournament. All subsequent state changes are recorded in the flip-flop array. In the pipelined implementation of FIGS. 8A–8C, the individual RAMs in each pipeline stage must also be replaced by a single multi-ported RAM with a separate read port for each pipeline stage.

FIG. 19 shows a block diagram of an unpipelined hardware engine that performs this alternative tournament sort. This is an adaptation of the logic of FIG. 4 and corresponding components are numbered identically. The RAM 200 in this case, however, holds only the counter values of the leaf nodes. It stores no IDs and no state for internal nodes. At the start of a sort, when the counter for one queue changes value, the ID and Key (count) of the changing queue are input to the engine on lines 325 and 326. During the first cycle, the key is written to the RAM array 200 to update the stored key for this queue. During each subsequent cycle, the addressing logic walks up the tree toward the root, computing in 303 the address of the parent of the node addressed during the previous cycle. This node address is applied to the multiplexers of the flip-flop array 991 which in turn returns to register 992 the ID of the leaf node that is the sibling winner at this level of the tree. The sibling winner address is then applied to the RAM 200 to read out to register 311 the key corresponding to the winner sibling at the internal node. This key is compared in comparator 313 to the key of the current node. The result of this comparison updates the state of the flip-flop array and, if the new key is the winner, replaces the key in the current key register 312.

Figure 20A:
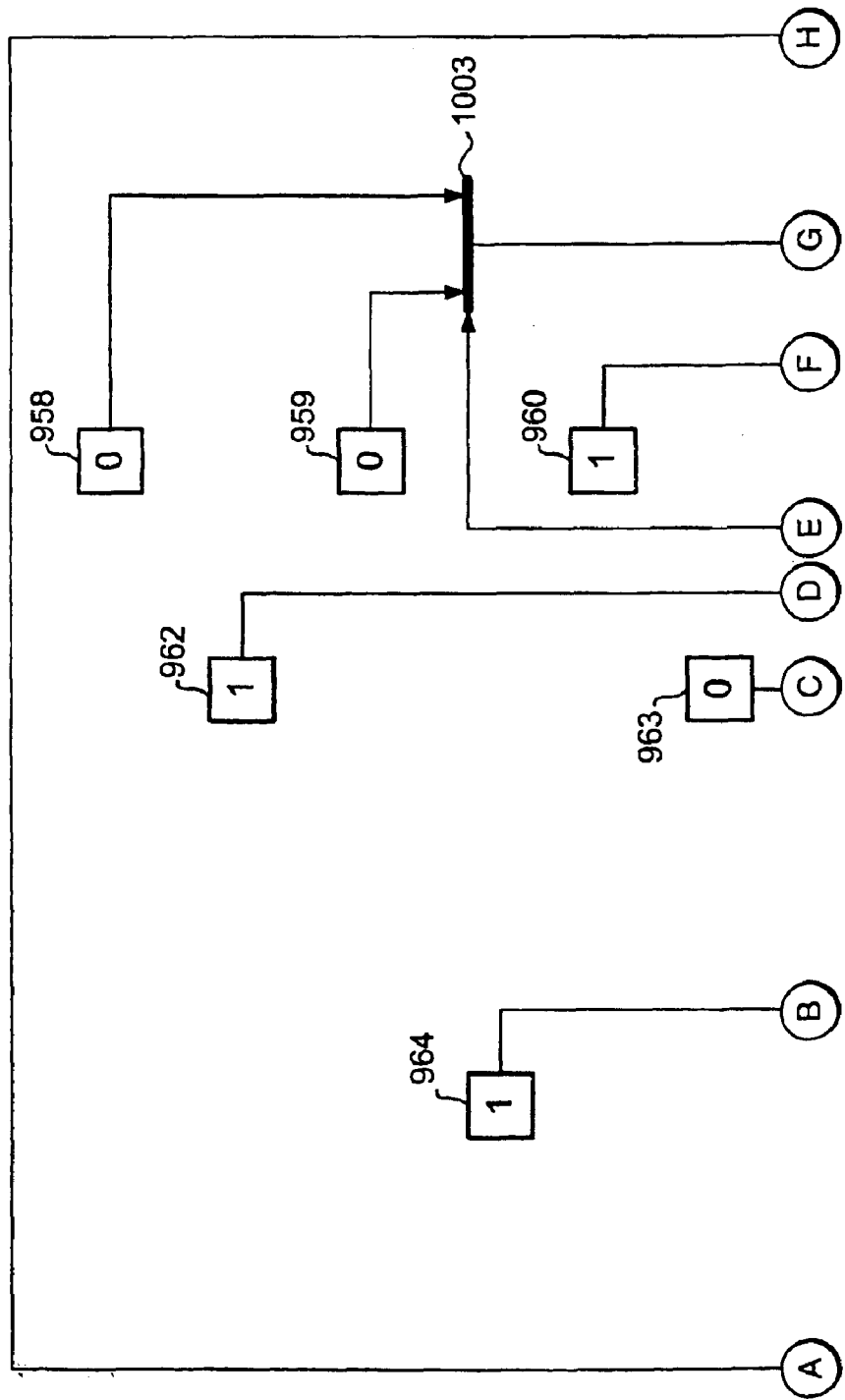
FIGS. 20A and 20B presents a hardware implementation of the flip-flop array of FIG. 19.
Figure 20B:
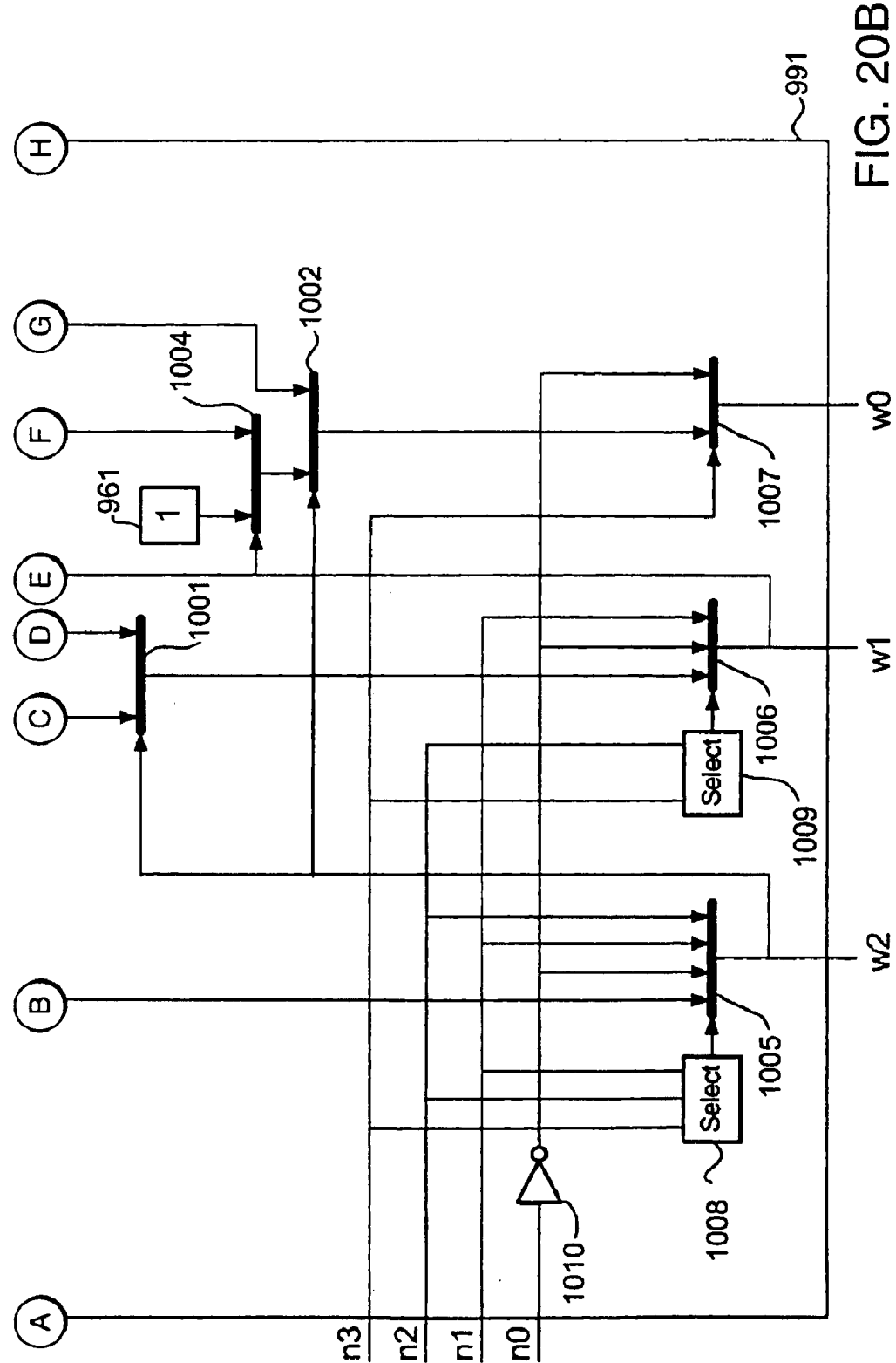

The details of the flip-flop array 991 of FIG. 19 are shown in FIGS. 20A–B. The flip-flop array accepts the current node address on lines n3 to n0, and outputs the address of the winning leaf node for the sibling tournament on lines w2 to w0. Inverter 1010 converts the node address to a sibling address by complementing the LSB. Flip flops 958 to 964 hold the results of each comparison in the tournament. The flip flops are shown with exactly the same state as FIG. 15. Multiplexers 1001 to 1007 compute the winner address based on the contents of the flip-flops and the input sibling address. Select boxes 1008 and 1009 are used to control multiplexers 1005 and 1006 to compute the bits of the winner address based on the stage of the tournament.

The function of the flip-flop array of FIGS. 20A–B is best understood by means of an example. Consider the case shown in FIG. 15 where the previous winner, node 5, has been updated with a new value, 9, and the tournament must now be rerun, from the left to the right in FIG. 15. To compute the winning address for the first match, the address of the sibling of node 5, 4, is applied to lines n3 to n0. Because line n3 is zero, the control input to all three of multiplexers 1005 to 1007 is zero and these multiplexers select their right most inputs passing node 4 to the output. Thus, the first match of the new tournament will be between leaf node 5, whose value is already in key register 312, and leaf node 4, whose value is read from the RAM. The result of this match, a 1 since node 5 still beats node 4, is used to update flip-flop 960.

After the first match is completed, parent logic 303 computes the address of the parent of node 5, 10 or 1010 in binary, and presents this address to the flip-flop array. In this case, the two select boxes output a 1 since n3 is a 1 but n2 is a 0, this causes n1 to be passed to w2 and the complement of n0 to be passed to w1. Thus, the upper two bits of the winner address will be 11. The control input of multiplexer 1007 is 1, from n3, causing it to select the output of multiplexer 1002 to drive bit w0. Multiplexer 1002 is in turn controlled by bit w2 which is a one and hence it selects the output of multiplexer 1004. This multiplexer is in turn controlled by bit w1 which is also a 1. Hence the state of flip-flop 961, a 1, is selected via multiplexers 1004, 1002, and 1007 to drive bit w0. This is because the winner of the match represented by node 961 (at address 11) was node 7. Hence the output winner address is binary 111 or 7. Node 7 wins the match between nodes 5 and 7. Flip-flop 963 is updated with the result of this victory, a 0.

For the third match, parent logic 303 outputs the parent of node 10, node 13 or 1101 in binary, and presents this address to the flip-flop array. Because the most significant three bits are 110, select box 1005 outputs a 2 selecting the complement of n0 as w2 and select box 1006 also outputs a 2, selecting the output of multiplexer 1001 as w1. Since w2 is zero, multiplexer 1001 selects the state of flip-flop 962, a 1 for w1. The combination of n3, w2, and w1 selects the state of flip-flop 959 for w0. Thus the winner address is 010, leaf node 2. Thus the third match is between node 2 and node 7. Node 2 wins this match. Flip-flop 964 is updated with the result of this victory and the tournament is complete with the flip flop array updated to the state shown in FIG. 16.

Multi-Stage Tournament Sort

Figure 17:
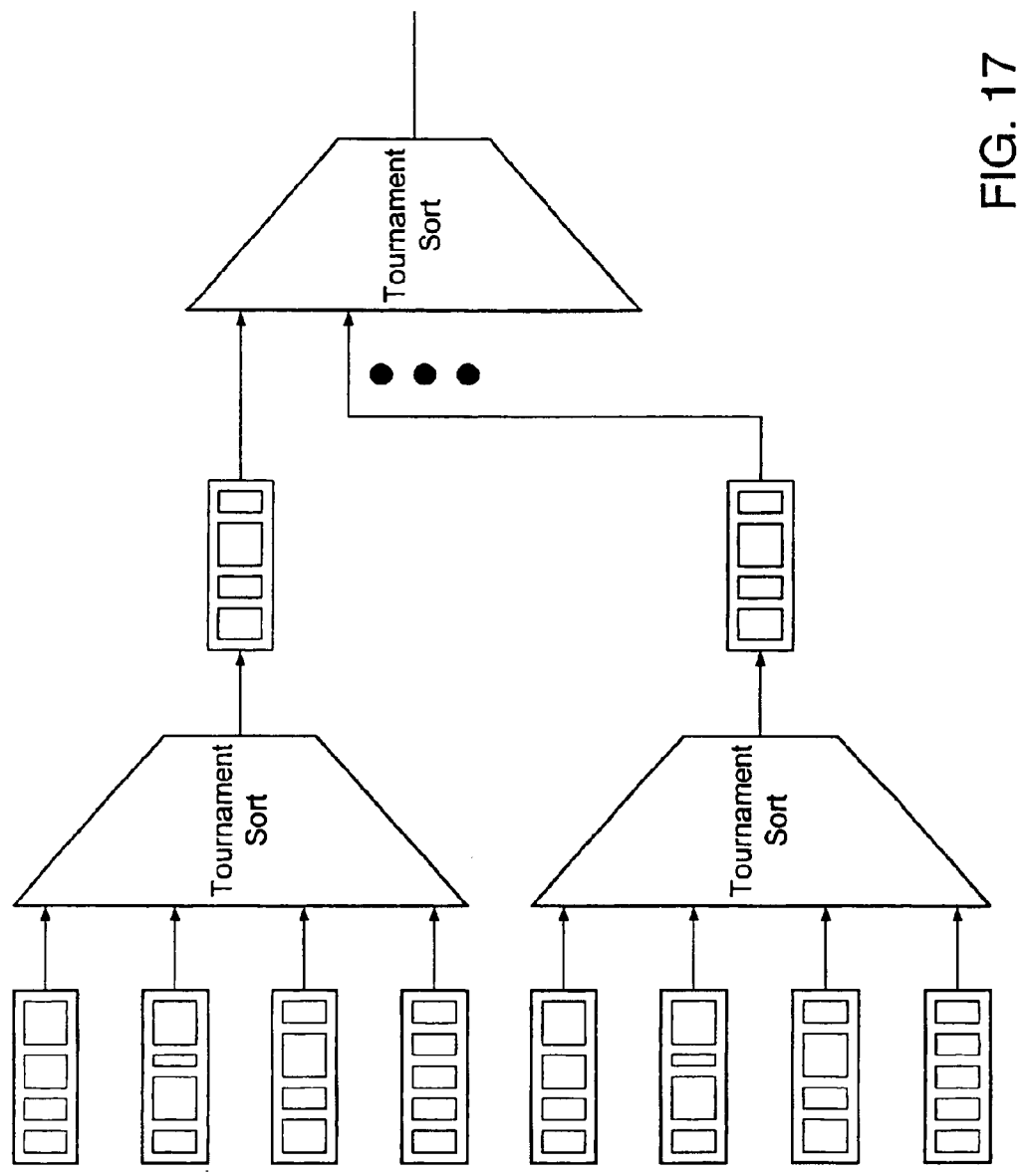
FIG. 17 illustrates a multi-stage embodiment of the invention.

In many cases it is desirable to partition the packet scheduling process into multiple stages as illustrated in FIG. 17. For example, one may wish to divide the bandwidth associated with an output trunk into several 'fractional' trunks. Packets may be scheduled by first performing one set of tournament sorts to select the next several packets for each 'fractional' trunk and queuing these packets in fractional trunk queues. Then, a second tournament sort is performed to schedule packets from the fractional trunk queues onto the line. As an example, each of plural fractional portions of the data transmitted on a fiber might be sorted according to different blends of scheduling method. One fractional portion might be scheduled according to a best efforts method, another according to both CBR and best methods, and so on. In the final stage, scheduling of all queues could be according to a CBR method to assure that each fraction gets its share of the bandwidth and no more.

In a second example, the packet scheduling function may be partitioned across two different modules or chips in a system. In this case, one set of tournament sorts is performed in a first module to select the next set of packets for each of several intermediate queues, and a separate tournament sort is performed in a second module to schedule packets from the heads of the intermediate queues to the output line.

One skilled in the art will understand that there are many variations on the output packet scheduler described here. For example three or more scheduling disciplines can be combined in order rather than the two (CBR and WFQ) described here. Different sorting algorithms may be used to select the next packet to be transmitted. The units being scheduled may be packets as in an IP router, cells as in an ATM switch, or frames as in a frame-relay switch.

While this invention has been particularly shown and described with references to preferred embodiments thereof, it will be understood by those skilled in the art that various changes in form and details may be made therein without departing from the scope of the invention encompassed by the appended claims.

What is claimed is:

1. A network router comprising:
   queues storing data packets to be forwarded; and
   a scheduler which selects queues from which packets are forwarded, the scheduler comprising:
   scheduling values associated with the queues;
   a selection network by which the scheduling values are compared to select packets to be forwarded, the selection network being a tree structure where each leaf of the tree structure represents a scheduling value of a queue and internal nodes of the tree structure represent winners in comparisons of scheduling values of sibling nodes of the tree structure; and
   a random access memory (RAM) for storing the tree structure, an address register which stores an address to access from the RAM a scheduling value to be compared, a compare register which stores a scheduling value to be compared to the scheduling value from the RAM and a comparator for comparing the scheduling values.

2. A network router as claimed in claim 1 wherein the scheduler limits comparisons of scheduling values to a path through the tree structure from a leaf node representing a changed scheduling value to a root of the tree structure.

3. A network router as claimed in claim 1 wherein the internal nodes of the tree structure store scheduling values from winning sibling nodes.

4. A network router as claimed in claim 3 wherein the internal nodes store identities of leaf nodes corresponding to the stored scheduling values.

5. A network router as claimed in claim 1 wherein the scheduler further comprises hardware which receives the address in the address register and determines a sibling node where a scheduling value to be compared is stored, and determines a parent node address at which a winning compared scheduling value is stored.

6. A network router as claimed in claim 1 wherein the scheduler comprises pipeline stages, each of which compares scheduling values indicated by separate portions of the tree structure.

7. A network router as claimed in claim 6 wherein the scheduler comprises a random access memory partitioned across the pipeline stages, each partition storing at least one level of the tree structure.

8. A network router as claimed in claim 1 wherein each node identifies a path to a winning leaf node.

9. A network router as claimed in claim 1 further comprising an indicator associated with each queue to disable the queue from scheduling.

10. A network router as claimed in claim 1 wherein the scheduling values include scheduled transmissions times according to a constant-bit-rate (CBR) service guarantee.

11. A network router as claimed in claim 10 wherein the scheduling values are updated to reflect variable packet links.

12. A network router as claimed in claim 10 further comprising scheduling values which represents theoretical transmission times using a weighted-fair-queuing (WFQ) scheduling policy.

13. A network router as claimed in claim 12 wherein the WFQ scheduling values are updated for variable packet lengths.

14. A network router as claimed in claim 1 further comprising scheduling values which represent theoretical transmission times using a weighted-fair-queuing (WFQ) scheduling policy.

15. A network router as claimed in claim 14 wherein the WFQ scheduling values are updated for variable packet lengths.

16. A network router as claimed in claim 14 wherein the scheduling values are updated to reflect byte stuffing applied to a prior packet.

17. A network router as claimed in claim 1, wherein the scheduler further comprises indicators associated with the queues to disable the queues, and wherein the selection network compares scheduling values of queues which are not disabled to forward data packets therefrom.

18. A network router comprising:
queues storing data packet to be forwarded; and
a scheduler which selects queues from which packets are forwarded, the scheduler comprising:
scheduling values associated with the queues;
a selection network by which the scheduling values are compared to select packets to be forwarded;
a random access memory partitioned across pipeline stages, each pipeline stage comparing scheduling values indicated by separate portions of the tree structure and each partition storing at least one level of the tree structure; and
an address register in each pipeline stage which stores an address to access from the RAM a scheduling value to be compared, a compare register which stores a scheduling value to be compared to a scheduling value from the RAM and a comparator for comparing the scheduling values.

19. A network router comprising:
queues storing data packets to be forwarded; and
a scheduler which selects queues from which packets are forwarded, the scheduler comprising:
scheduling values associated with the queues;
a selection network by which the scheduling values are compared to select packets to be forwarded, the selection network being a tree structure where each leaf of the tree structure represents a scheduling value of a queue and internal nodes of the tree structure represent winners in comparisons of scheduling values of sibling nodes of the tree structure, with each node identifying a path to a winning leaf node; and
a random access memory which stores leaf nodes, a flip-flop array which identifies the winner at each internal node and a comparator for comparing scheduling values of the leaf nodes from the RAM indicated by the data stored in the flip-flop array.

20. A network router comprising:
queues storing data packets to be forwarded; and
a scheduler which selects queues from which packets are forwarded, the scheduler comprising:
scheduling values associated with the queues, the scheduling values including scheduled transmission times according to a constant-bit-rate (CBR) guarantee wherein the scheduling values are updated to reflect byte stuffing applied to a prior packet; and
a selection network by which the scheduling values are compared to select packets to be forwarded, the selection network being a tree structure where each leaf of the tree structure represents a scheduling value of a queue and internal nodes of the tree structure represent winners in comparisons of scheduling values of sibling nodes of the tree structure.

21. A network router comprising:
queues storing data packet to be forwarded; and
a scheduler which selects queues from which packets are forwarded, the scheduler comprising:
scheduling values associated with the queues, the scheduling values including scheduled transmission times according to a constant-bit-rate (CBR) guarantee and representing theoretical transmission times using a weighted-fair-queuing (WFQ) scheduling policy wherein the scheduling values are updated to reflect byte stuffing applied to a prior packet; and
a selection network by which the scheduling values are compared to select packets to be forwarded, the selection network being a tree structure where each leaf of the tree structure represents a scheduling value of a queue and internal nodes of the tree structure represent winners in comparisons of scheduling values of sibling nodes of the tree structure.

22. A network router comprising:
queues storing data packets to be forwarded; and
a scheduler which selects queues from which packets are forwarded, the scheduler comprising:
first scheduling values corresponding to a first scheduling method associated with a first subset of queues;
second scheduling values corresponding to a second scheduling method associated with a second subset of queues, at least one queue being a member of each of the first subset and second subset of queues; and
a queue selector by which first scheduling values are compared and second scheduling values are compared to select packets to be forwarded.

23. A network router as claimed in claim 22 wherein the first scheduling method is constant bit rate (CBR) scheduling and the second scheduling method is weighted-fair-queuing (WFQ) scheduling.

24. A network router as claimed in claim 23 wherein the scheduler selects a queue by:
identifying an earliest scheduled CBR queue;
if the scheduling value of the identified CBR queue is less than or equal to a current time, transmitting a corresponding packet from the CBR queue and updating the CBR scheduling value associated with the queue; and
otherwise, transmitting a packet from a WFQ queue having an earliest scheduling value and updating the scheduling value of that queue.

25. A network router comprising:
queues storing data packets to be forwarded; and
a scheduler which selects queues from which packets are forwarded, the scheduler comprising:
scheduling values associated with the queues, the scheduling values being updated to reflect byte stuffing applied to a prior packet;
a selector by which scheduling values are compared to select packets to be forwarded; and
a scheduling value updater which updates the scheduling value of a queue based on a variable length of a packet in the queue.

26. A network router as claimed in claim 25 wherein the scheduler selects a queue by:

identifying an earliest scheduled CBR queue;
if the scheduling value of the identified CBR queue is less than or equal to a current time, transmitting a corresponding packet from the CBR queue and updating the CBR scheduling value associated with the queue; and
otherwise, transmitting a packet from a WFQ packet having an earliest scheduling value and updating the scheduling value of that queue.

27. A network router comprising:
queues storing data packets to be forwarded; and
a scheduler which selects queues from which packets are forwarded, the scheduler comprising:
scheduling values associated with the queues;
a selector by which scheduling values are compared to select packets to be forwarded; and
a scheduling value updater which updates the scheduling value of a queue based on a variable length of a packet in the queue;
wherein the scheduler selects a queue by:
identifying an earliest scheduled CBR queue;
if the scheduling value of the identified CBR queue is less than or equal to a current time, transmitting a corresponding packet from the CBR queue and updating the CBR scheduling value associated with the queue; and
otherwise, transmitting a packet from a WFQ packet having an earliest scheduling value and updating the scheduling value of that queue.

28. A method of routing data packets comprising:
storing data packets in queues;
associated scheduling values with the queues; and
comparing scheduling values in a selection network to select queues from which packets are forwarded, the selection network being a tree structure where each leaf of the tress structure represents a scheduling value of a queue and internal nodes of the tree structure represent winners in comparisons of scheduling values of sibling nodes of the tree structure wherein the tree structure is stored in a random access memory (RAM) and scheduling values from a compare register and from the RAM are compared.

29. A method as claimed in claim 28 wherein the scheduler limits comparisons of scheduling values to a path through the tree structure from a leaf node representing a changed scheduling value to a root of the tree structure.

30. A method as claimed in claim 28 wherein the internal nodes of the tree structure store scheduling values from winning sibling nodes.

31. A method as claimed in claim 30 wherein the internal nodes store identities of leaf nodes corresponding to the stored scheduling values.

32. A method as claimed in claim 28 further comprising determining a sibling node where a scheduling value to be compared is stored, and determining a parent node address at which a winning compared scheduling value is stored.

33. A method as claimed in claim 28 further comprising comparing scheduling values indicated by separate portions of the tree structure in pipeline stages.

34. A method as claimed in claim 33 further comprising storing at least one level of the tree structure in a partition of a random access memory (RAM) partitioned across the pipeline stages.

35. A method as claimed in claim 34 further comprising, in each pipeline stage, comparing scheduling values from a compare register and from the RAM.

36. A method as claimed in claim 28 wherein each node identifies a path to a winning leaf node.

37. A method as claimed in claim 36 wherein leaf nodes of the tree structure are stored in the random access memory and the winner at each internal node is identified in a flip-flop array, the method comprising comparing scheduling values of the leaf nodes from the RAM indicated by the data stored in the flip-flop array.

38. A method as claimed in claim 28 further comprising providing an indicator associated with each queue to disable the queue from scheduling.

39. A method as claimed in claim 28 wherein the scheduling values include scheduled transmission times according to a constant-bit-rate (CBR) service guarantee.

40. A method as claimed in claim 39 wherein the scheduling values are updated to reflect variable packet lengths.

41. A method as claimed in claim 39 wherein scheduling values represent theoretical transmission times using a weighted-fair-queuing (WFQ) scheduling policy.

42. A method as claimed in claim 41 wherein the WFQ scheduling values are updated for variable packet lengths.

43. A method as claimed in claim 28 wherein scheduling values represent theoretical transmission times using a weighted-fair-queuing (WFQ) scheduling policy.

44. A method as claimed in claim 28 wherein the WFQ scheduling values are updated for variable packet lengths.

45. A method as claimed in claim 28 further comprising associating indicators with the queues to disable the queues, wherein comparing scheduling values further comprises:
comparing scheduling values of queues which are not disabled before the data packets therefrom.

46. A method of routing data packets comprising:
storing data packet in queues;
associating scheduling values with the queues; and
comparing scheduling values in a selection network to select queues from which packets are forwarded, the scheduling values including scheduled transmission times according to a constant-bit-rate (CBR) service guarantee; and
updating the scheduling values to reflect byte stuffing applied to a prior packet.

47. A method as claimed in claim 46 wherein the selection network is a sorting network by which the scheduling values are compared to order the queues by scheduling priority.

48. A method of routing data packets comprising:
storing data packets in queues;
associating scheduling values with the queues;
comparing scheduling values in a selection network to select queues from which packets are forwarded, the scheduling values including scheduled transmission times according to a constant-bit-rate (CBR) service guarantee and representing transmission times using a weighted-fair-queuing (WFQ) scheduling policy; and
updating the scheduling values to reflect byte stuffing applied to a prior packet.

49. A method of routing data packets comprising:
storing data packets in queues;
associating scheduling values with the queues; and
comparing scheduling values in a selection network to select queues from which packets are forwarded, the scheduling values representing transmission times using a weighted-fair-queuing (WFQ) scheduling policy; and
updating the scheduling values to reflect byte stuffing applied to a prior packet.

50. A method of routing data packets comprising:
storing data packets in queues;

associating scheduling values corresponding to a first scheduling method with a first subset of queues;

associating scheduling values corresponding to a second scheduling method with a second subset of queues, at least one queue being a member of each of the first subset and second subset of queues; and comparing scheduling values to select packets to be forwarded, excess capacity under the first scheduling method being available for scheduling under the second scheduling method.

51. A network router as claimed in claim 50 wherein the first scheduling method is constant bit rate (CBR) scheduling and the second scheduling method is weighted-fair-queuing (WFQ) scheduling.

52. A network router as claimed in claim 50 wherein the scheduler selects a queue by:

identifying an earliest scheduled CBR queue;

if the scheduling value of the identified CBR queue is less than or equal to a current time, transmitting a corresponding packet from the CBR queue and updating the CBR scheduling value associated with the queue; and otherwise, transmitting a packet from a WFQ queue having an earliest scheduling value and updating the scheduling value of that queue.

53. A method of routing data packets comprising:

storing data packets in queues;

associating scheduling values with the queues;

comparing scheduling values to select data packets to be forwarded; and updating the scheduling value of a queue based on a variable length of a packet in the queue to reflect byte stuffing applied to a prior packet.

54. A network router as claimed in claim 53 wherein the scheduler selects a queue by:

identifying an earliest scheduled CBR queue;

if the scheduling value of the identified CBR queue is less than or equal to a current time, transmitting a corresponding packet from the CBR queue and updating the CBR scheduling value associated with the queue; and otherwise, transmitting a packet from a WFQ packet having an earliest scheduling value and updating the scheduling value of that queue.

55. A method of routing data packets comprising:

storing data packets in queues;

associating scheduling values with the queues;

comparing scheduling values to select data packets to be forwarded; and updating the scheduling value of a queue based on a variable length of a packet in the queue;

wherein the scheduler selects a queue by:

identifying an earliest scheduled CBR queue;

if the scheduling value of the identified CBR queue is less than or equal to a current time, transmitting a corresponding packet from the CBR queue and updating the CBR scheduling value associated with the queue; and otherwise, transmitting a packet from a WFQ packet having an earliest scheduling value and updating the scheduling value of that queue.

56. A network router comprising:

queues storing data packets to be forwarded; and scheduling means for selecting queues from which packets are forwarded, the scheduling means comprising:

first scheduling values corresponding to a first scheduling method associated with a first subset of queues;

second scheduling values corresponding to a second scheduling method associated with a second subset of queues, at least one queue being a member of each of the first subset and second subset of queues; and queue selecting means for comparing first scheduling values and second scheduling values to select packets to be forwarded.

\* \* \* \* \*

UNITED STATES PATENT AND TRADEMARK OFFICE
CERTIFICATE OF CORRECTION

PATENT NO. : 6,891,834 B1  
DATED : May 10, 2005  
INVENTOR(S) : William J. Dally et al.

It is certified that error appears in the above-identified patent and that said Letters Patent is hereby corrected as shown below:

Column 16,  
Line 61, delete "transmissions" and insert -- transmission --.  
Line 67, delete "represents" and insert -- represent --.

Column 17,  
Line 22, delete "packet" and insert -- packets --.

Column 18,  
Line 9, delete "packet" and insert -- packets --.

Column 19,  
Line 31, delete "associated" and insert -- associating --; and  
Line 35, delete "tress" and insert -- tree --.

Column 20,  
Line 31, delete "packet" and insert -- packets --.

Signed and Sealed this

Second Day of August, 2005

JON W. DUDAS  
*Director of the United States Patent and Trademark Office*